(12) United States Patent
Funahata et al.

(10) Patent No.: US 6,803,980 B2
(45) Date of Patent: Oct. 12, 2004

(54) REFLECTIVE COLOR LIQUID CRYSTAL DISPLAY APPARATUS

(75) Inventors: Katsuyuki Funahata, Hitachi (JP); Shinichi Komura, Hitachi (JP); Kazuhiro Kuwabara, Hitachi (JP); Osamu Itou, Hitachi (JP); Katsumi Kondo, Mito (JP); Makoto Yoneya, Hitachinaka (JP); Makoto Abe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/219,291

(22) Filed: Aug. 16, 2002

(65) Prior Publication Data

US 2002/0191134 A1 Dec. 19, 2002

Related U.S. Application Data

(62) Division of application No. 09/425,614, filed on Oct. 22, 1999, now Pat. No. 6,476,890.

(30) Foreign Application Priority Data

Oct. 23, 1998 (JP) .......................................... 10-301799
May 17, 1999 (JP) .......................................... 11-135378

(51) Int. Cl.[7] .......................................... G02F 1/1335
(52) U.S. Cl. .................................................. 349/113
(58) Field of Search ................................ 349/113, 110, 349/106

(56) References Cited

U.S. PATENT DOCUMENTS

| | | | | |
|---|---|---|---|---|
| 5,526,149 A | | 6/1996 | Kanbe et al. ................ 349/113 |
| 6,008,875 A | | 12/1999 | Ikeno et al. ................. 349/139 |
| 6,061,111 A | | 5/2000 | Kataoka et al. ............. 349/113 |
| 6,141,073 A | * | 10/2000 | Sasaki et al. ................ 349/122 |
| 6,172,723 B1 | * | 1/2001 | Inoue et al. .................. 349/95 |
| 6,219,122 B1 | | 4/2001 | Uchida et al. .............. 349/113 |
| 6,233,031 B1 | | 5/2001 | Ishitaka ...................... 349/113 |
| 6,259,499 B1 | * | 7/2001 | Yamanashi .................. 349/113 |
| 6,304,308 B1 | * | 10/2001 | Saito et al. ................. 349/155 |
| 6,373,540 B1 | * | 4/2002 | Munakata .................... 349/117 |

FOREIGN PATENT DOCUMENTS

| | | | | |
|---|---|---|---|---|
| JP | 6-075238 | | 3/1994 | |
| JP | 09015418 A | * | 1/1997 | ............ G02B/5/20 |
| JP | 10-268300 | | 10/1998 | |

* cited by examiner

*Primary Examiner*—Kenneth Parker
(74) *Attorney, Agent, or Firm*—Antonelli, Terry, Stout & Kraus, LLP

(57) ABSTRACT

A reflective liquid crystal display apparatus with pixels includes a first electrode substrate, a second electrode substrate and a liquid crystal layer. The first electrode substrate includes a polymer layer having plural protrusions or depressions arranged randomly formed on a glass substrate, and a reflective layer, color filters, transparent electrodes, and an alignment layer formed and laminated sequentially on the polymer layer. The second electrode substrate, includes transparent electrodes and an alignment layer formed and laminated on a glass substrate, and arranged so that the alignment layer faces the alignment layer on the first electrode substrate. The liquid crystal layer is formed by filling a liquid crystal composition into an interval between the first and second electrode substrates. Portions of the reflective layer corresponding to the portions of each pixel other than apertures of each pixel are colored black.

4 Claims, 11 Drawing Sheets

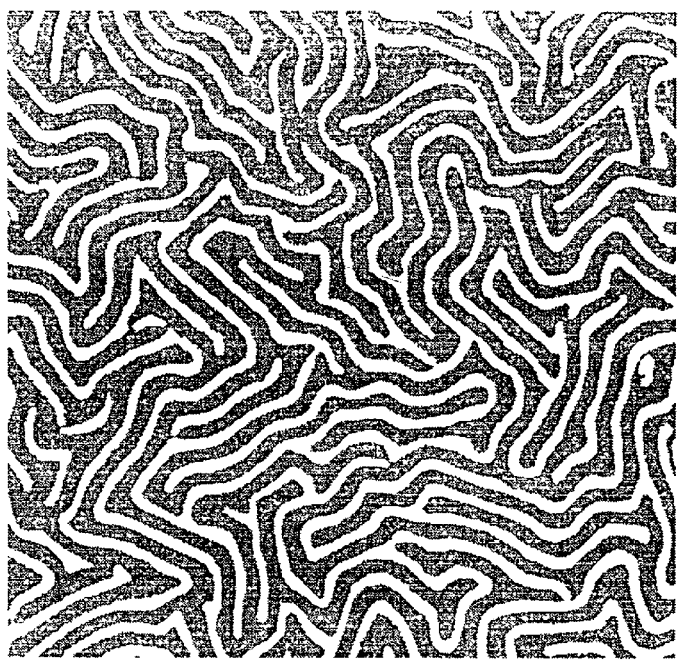
FIG. 9(a)
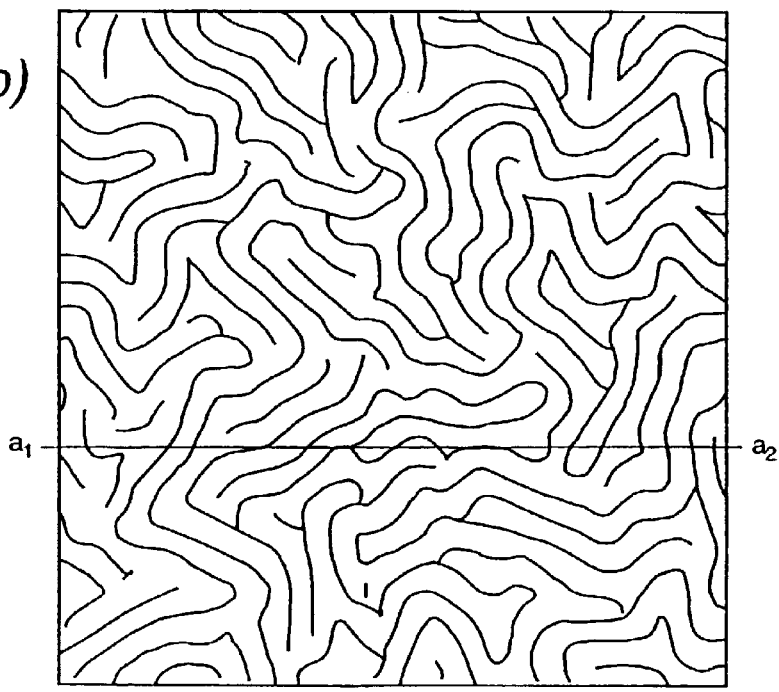
FIG. 9(b)
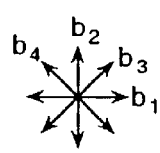

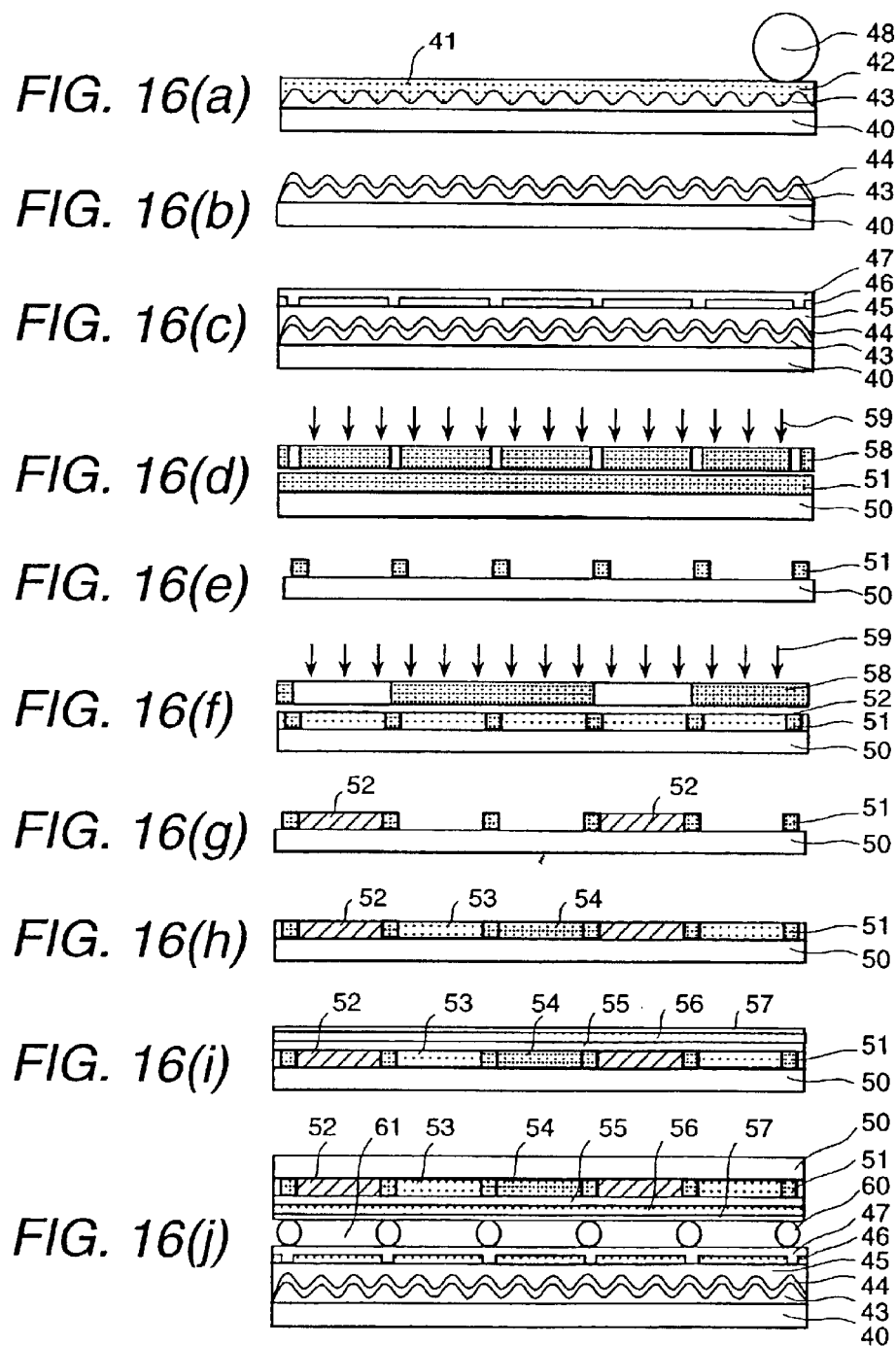

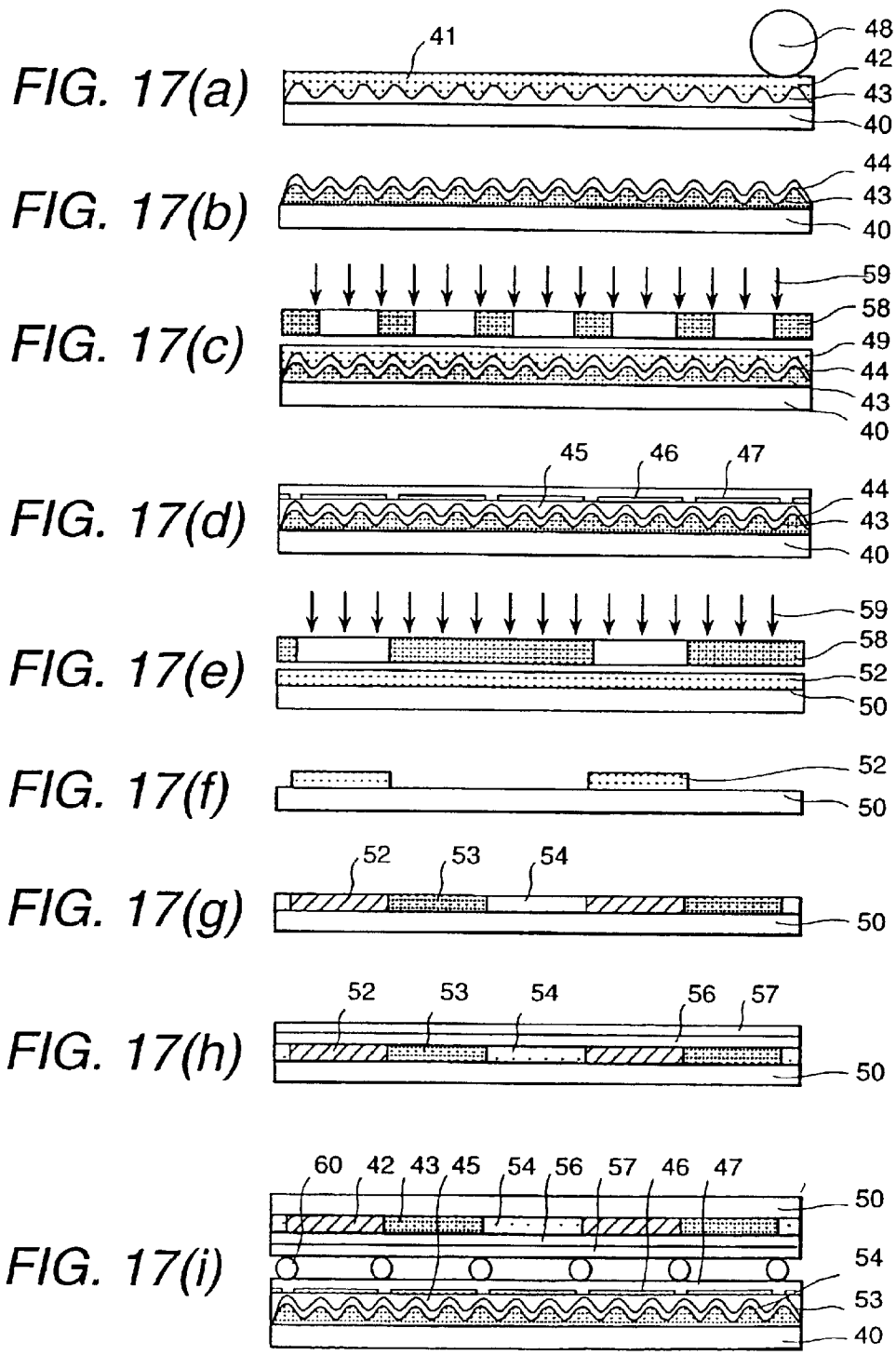

REFLECTIVE COLOR LIQUID CRYSTAL DISPLAY APPARATUS

CROSS-REFERENCE TO RELATED APPLICATION

This is a Divisional application of U.S. patent application Ser. No. 09/425,614, filed Oct. 22, 1999, now U.S. Pat. No. 6,476,890, the subject matter of which is incorporated by reference herein.

BACKGROUND OF THE INVENTION

The present invention relates to a liquid crystal display apparatus, in particular, to a liquid crystal display apparatus provided with an effective function for producing a reflective color display.

A conventional reflective color liquid crystal display apparatus, which comprises a reflector provided with many micro-protrusions formed of resin, is disclosed in JP-A-4-243226 (1992). A color filter for a reflective color liquid crystal display apparatus is disclosed in JP-A-6-230364 (1994) and other publications. The color filter will not create any problems in the driving of a liquid crystal, such as when an optical reflector causes an electrical short circuit with transparent electrodes via a defect in the color filter, if the reflector is patterned to a shape approximately the same as the shape of the color filter.

A reflector comprising many fine protrusion-depression reflecting planes, whereon circular protrusions or depressions are arranged irregularly so as not to generate optical interference, has been proposed.

Furthermore, JP-A-10-177106 (1998) discloses a liquid crystal display apparatus, in which a liquid crystal element comprises a reflector, which is made to collect incident light in a specified direction by forming circular protrusions or depressions having unsymmetrical distribution of slope angles in their cross sectional shape.

SUMMARY OF THE INVENTION

In accordance with the prior techniques described above, the use of a black matrix becomes unnecessary, because the liquid crystal driving will not create any problems, such as when an optical reflecting film forming a reflector causes an electrical short circuit with transparent electrodes via a defect of a color filter, if the reflector is patterned to a shape approximately the same as the shape of the color filter, and so unnecessary reflection of light from an unopened portion can be prevented. However, the color filter for a reflective color liquid crystal display apparatus has a problem in that contrast is decreased with an element structure having no black matrix layer, depending on the display mode (for instance, normally open mode), because the color filter for a reflective color liquid crystal display apparatus must have spectral characteristics positively utilizing the light in a certain wavelength region, which should be shielded naturally.

Because a liquid crystal layer having a uniform thickness could not be formed with the composition of the liquid crystal display devices described above, wherein only a color filter layer was formed on a surface-roughened reflector, the color filter had an additional problem in that the quality of display (brightness and contrast) was decreased.

In accordance with the prior liquid crystal display devices, if a leveling layer was provided on the color filter layer for forming a liquid crystal layer having an uniform thickness, a problem, such as a decrease of the brightness, and other problems were generated.

The prior liquid crystal display devices had a problem in that the display was dark, because, in order to prevent coloring caused by optical interference by arranging circular protrusions or depressions irregularly in a region corresponding to pixel electrode portions, the number of protrusions or depressions, which were reflecting elements for controlling incident light, was decreased significantly from a case in which the protrusions or depressions were arranged in a closely packed manner.

In accordance with the prior liquid crystal display devices, reflected light was collected in a specified direction by making the slope angle distribution of the circular protrusions or depressions unsymmetrical. Therefore, there was a problem, such as difficulty in controlling the shape of the fine protrusions or depressions, because the manufacturing process became complex.

Furthermore, in accordance with the prior liquid crystal display devices, fine circular protrusions or depressions were formed by a photolithography method. Therefore, there was a problem, such as a high cost of manufacture, because the manufacturing process was complex, and the number of manufacturing steps was large.

The object of the present invention is to provide a liquid crystal display apparatus comprising a reflector having preferable reflecting characteristics by solving the above described problems, and to provide a method of manufacture thereof.

As a first means for achieving the above object, the reflective color liquid crystal display apparatus of the present invention uses the following liquid crystal display construction.

The liquid crystal display apparatus comprises an electrode substrate, wherein a reflector composed of a metal, such as aluminum, silver, and the like, is deposited on many fine protrusions and depressions formed on a resin layer, wherein a black pigment having a light shielding function is dispersed, and the resin layer is disposed on a glass substrate. Color filters of red, green, and blue having a leveling function are formed on the reflector; and transparent electrodes and an alignment layer are formed on the color filters. The liquid crystal display apparatus has another electrode substrate, wherein transparent electrodes and an alignment layer are formed on a glass substrate. The liquid crystal display apparatus is manufactured by joining the electrode substrates via a spacing material for defining the thickness of the liquid crystal so that each of the alignment layers face each other, filling liquid crystal into the interval between the electrode substrates by any method such as a vacuum filling method and the like, and sealing the interval.

As a second means for achieving the above object, the reflective color liquid crystal display apparatus of the present invention has a reflector composed by laminating a polymer layer having protrusions and depressions and a reflective layer onto a glass substrate. The reflector comprises the polymer layer, whereon fine protrusion-depression planes are formed by the following method and the like in order to achieve the above object.

1) string-shaped protrusions having smooth curves, or string-shaped depressions are arranged continuously and alternately;
2) string-shaped protrusions having a smooth curve are arranged continuously; and
3) string-shaped depressions having a smooth curve are arranged continuously.

In the reflector of the reflective liquid crystal display apparatus of the present invention, fine protrusion-depression planes are formed on the polymer layer by arranging the string-shaped protrusions or the string-shaped depressions in such a manner that the slope angle distribution of the cross sectional shapes of the depressions, and depressions in a direction at a right angle to the longitudinal direction, is approximately symmetrical from right and left, and the total lengths of the respective string-shaped protrusions or string-shaped depressions in respective directions are approximately equal.

In the reflector of the reflective liquid crystal display apparatus of the present invention, fine protrusion-depression planes are formed on the polymer layer by arranging the string-shaped protrusions or the string-shaped depressions in such a manner that the slope angle distribution of the cross section shapes of the depressions, and the depressions in a direction at a right angle to the longitudinal direction, is approximately symmetrical from right and left, and the total lengths of the respective string-shaped protrusions or string-shaped depressions in respective directions differ from each other.

The reflective liquid crystal display apparatus of the present invention is featured in having an electrode substrate formed by a polymer layer, which comprises fine protrusion-depression planes composed of string-shaped protrusions and string-shaped depressions, a reflective layer, an insulating layer, transparent electrodes, and an alignment layer laminated on a glass substrate; and another electrode substrate comprising a black matrix layer, color filters, a leveling layer, transparent electrodes, and an alignment layer laminated on a glass substrate; wherein the substrates are arranged so that the transparent electrodes of the above respective electrode substrates face each other on either side of the liquid crystal layer.

The reflective liquid crystal display apparatus of the present invention is featured in having an electrode substrate formed by polymer layers, wherein a black pigment and the like is dispersed, comprising fine protrusion-depression planes composed of string-shaped protrusions and string-shaped depressions, rectangular reflective layers arranged only at portions corresponding to the pixels, color filters, leveling layers, transparent electrodes, and alignment layers laminated on a glass substrate; and another electrode substrate comprising transparent electrodes, and alignment layers laminated on a glass substrate; wherein the substrates are arranged so that the transparent electrodes of the above respective electrode substrates face each other on either side of the liquid crystal layer.

The reflective liquid crystal display apparatus of the present invention is featured by a protrusion-depression pattern composed of protrusions or depressions formed by a simulation method of phase separation pattern generation by spinodal decomposition, the protrusion-depression pattern being used as a black matrix pattern for a photo mask used in forming the polymer layer, or a master pattern for a protrusion-depression pattern formed in a transcription die.

In the formation of the reflective liquid crystal display apparatus of the present invention, the simulation method for pattern generation by spinodal decomposition is a numerical simulation using:
1) Cahn-Hilliard-Cook equation,
2) Time dependent Ginzburg-Landau equation
3) Cell-Dynamical-System equation, and others.

In the formation of the reflective liquid crystal display apparatus of the present invention, the pattern of a black matrix portion or the pattern of a transparent portion for the photo mask used in forming the reflector is either a pattern generated by simulation of the spinodal decomposition, or a pattern obtained by image processing of the pattern generated by simulation of the spinodal decomposition and taken into a computer and the like.

In the formation of the reflective liquid crystal display apparatus of the present invention, the pattern generated by the simulation method is either a pattern indicating reflecting characteristics which are uniform in all directions, or a pattern indicating reflecting characteristics in which incident light is collected in a specified direction.

In the reflective liquid crystal display apparatus of the present invention, the liquid crystal display elements comprise a reflective electrode substrate, composed by laminating a reflector formed on a polymer layer comprising smooth protrusion-depression planes composed of a string-shaped pattern, which can be arranged in a closely packed manner, an insulating layer, plural transparent electrodes, and an alignment layer on one side of a glass substrate; a color filter substrate, composed by laminating a black matrix layer, color filters, a leveling layer, plural transparent electrodes, and an alignment layer on one side of another glass substrate; and liquid crystal filled in an interval between the reflective electrode substrate and the color filter substrate.

The manufacture of the reflective liquid crystal display apparatus of the present invention includes a method of forming a reflection electrode substrate, comprising the steps of: applying a photosensitive resin onto a glass substrate, and forming a polymer layer comprising smooth protrusion-depression planes composed of string-shaped protrusions and string shaped depressions using a transcription casting roll, or a template, and the like having protrusions and depressions satisfying predetermined conditions; forming a reflective layer onto the polymer layer, and forming an insulating layer onto the reflective layer, forming transparent electrodes onto the insulating layer, and forming an alignment layer onto the transparent electrodes. The manufacture of the reflective liquid crystal display apparatus further includes a method of forming a color filter substrate comprising the steps of: forming a black matrix layer onto one side of another glass substrate, forming color filters onto the black matrix layer, forming a leveling layer onto the color filter, forming transparent electrodes onto the leveling layer, and forming an alignment layer onto the transparent electrodes. Then, liquid crystal materials is filled into an interval between the reflection electrode substrate and the color filter substrate, and the interval is sealed.

Furthermore, the method of manufacturing the reflective liquid crystal display apparatus of the present invention comprises forming a reflector on a glass substrate, whereon a polymer layer comprising smooth protrusion-depression planes satisfying at least one of the following conditions has been formed:

1) a string-shaped pattern having smooth curves;
2) a pattern wherein string-shaped protrusions and string-shaped depressions are arranged so that the protrusions and depressions are arranged continuously, or the protrusions or the depressions are arranged continuously; and
3) a pattern wherein sums of total length components in any direction of the protrusions and corresponding direction of the depressions are approximately equal, or the sums of the total length components in respective directions of the protrusions and that of the depressions are different from each other.

The method of manufacturing a reflective liquid crystal display apparatus includes forming a reflection electrode substrate comprising the steps of: applying a photosensitive resin onto a side of a glass substrate to form a polymer layer comprising smooth protrusion-depression planes by patterning the polymer layer with a transcription casting roll, or a template, and the like, whereon the pattern is formed to satisfy the above conditions; shaping the polymer layer comprising the protrusion-depression planes to smooth the protrusion-depression planes by irradiating light or heat treating the substrate; forming a reflective layer onto the polymer layer comprising the smooth protrusion-depression planes; forming a leveling layer onto the reflective layer, forming plural transparent electrodes onto the leveling layer, and forming an alignment layer onto the transparent electrodes. The method of manufacture also includes forming a color filter substrate comprising the steps of: forming a black matrix layer onto another glass substrate, forming color layers onto the black matrix layer, forming a leveling layer onto the coloring layers, forming plural transparent electrodes onto the leveling layer, and forming an alignment layer onto the transparent electrodes. The method of manufacture further comprises the steps of joining the respective substrates with the alignment layers facing each other, filling liquid crystal into an interval between the reflection electrode substrate and the color filter substrate, and sealing the interval. The method of manufacturing the reflective liquid crystal display apparatus further comprises the steps of adhering a designated phase plate and polarizer on the surface of the glass substrate other than the surface whereon the color filters of the liquid crystal display element are formed, connecting a tape carrier package (hereinafter called TCP) whereon an IC for driving the liquid crystal is mounted, and an external circuit for driving to the liquid crystal display element, and assembling the liquid crystal display element into a frame, case, and the like.

Another method of manufacturing a reflective liquid crystal display apparatus involves manufacturing a reflective liquid crystal display element having a reflector, wherein the reflector is formed on a glass substrate having many fine protrusions or depressions formed thereon. The method of manufacturing a liquid crystal display element includes forming a reflection electrode substrate comprising the steps of: applying a photosensitive resin onto a side of a glass substrate and, subsequently, forming a polymer layer comprising smooth protrusion-depression planes, whereon string-shaped protrusions and string-shaped depressions are arranged continuously and alternately, by patterning the polymer layer by heat treatment after exposing and developing the photosensitive resin via a light shielding means, wherein the pattern is formed using a simulation of spinodal decomposition so that the string-shaped pattern comprises smooth curves having a uniform width and a designated length component in a black matrix region or a transparent region, and the sum of the length components in the black matrix region or transparent region become approximately equal each other in respective directions; forming a reflective film on the polymer layer having the protrusion-depression planes, forming a leveling layer on the reflective layer, and forming plural transparent electrodes on the leveling layer. The method of manufacture also includes forming a color filter substrate comprising the steps of: forming a black matrix layer onto another glass substrate, forming color filters onto the black matrix layer, forming a leveling layer onto the color filters, and forming plural transparent electrodes onto the leveling layer. The method of manufacture further comprises the steps of jointing the respective substrates with the transparent electrodes facing each other, filling liquid crystal into an interval between the reflection electrode substrate and the color filter substrate, and sealing the interval. The method of manufacturing a reflective liquid crystal display apparatus is completed by adhering a designated phase plate and polarizer on the surface of the glass substrate other than the plane whereon the color filters of the liquid crystal display element are formed, connecting TCP, whereon an IC for driving the liquid crystal is mounted, and an external driving circuit to the liquid crystal display element, and assembling the liquid crystal display element into a frame, case, and the like.

BRIEF DESCRIPTION OF THE DRAWINGS

FIGS. 9(a) and 9(b) are diagrams which illustrate a photo mask pattern, for forming protrusions and depressions composed of string-shaped protrusions and string-shaped depressions, and a polymer layer generated by the photo mask pattern, respectively;

FIGS. 16(a) to 16(j) show a set of schematic cross sections indicating steps in a method of manufacturing the reflective color liquid crystal display element in the embodiment 6; and FIGS. 17(a) to 17(i) shown a set of schematic cross sections indicating steps in a method of manufacturing the reflective color liquid crystal display element in the embodiment 7.

DETAILED DESCRIPTION OF THE EMBODIMENTS

Figure 1:
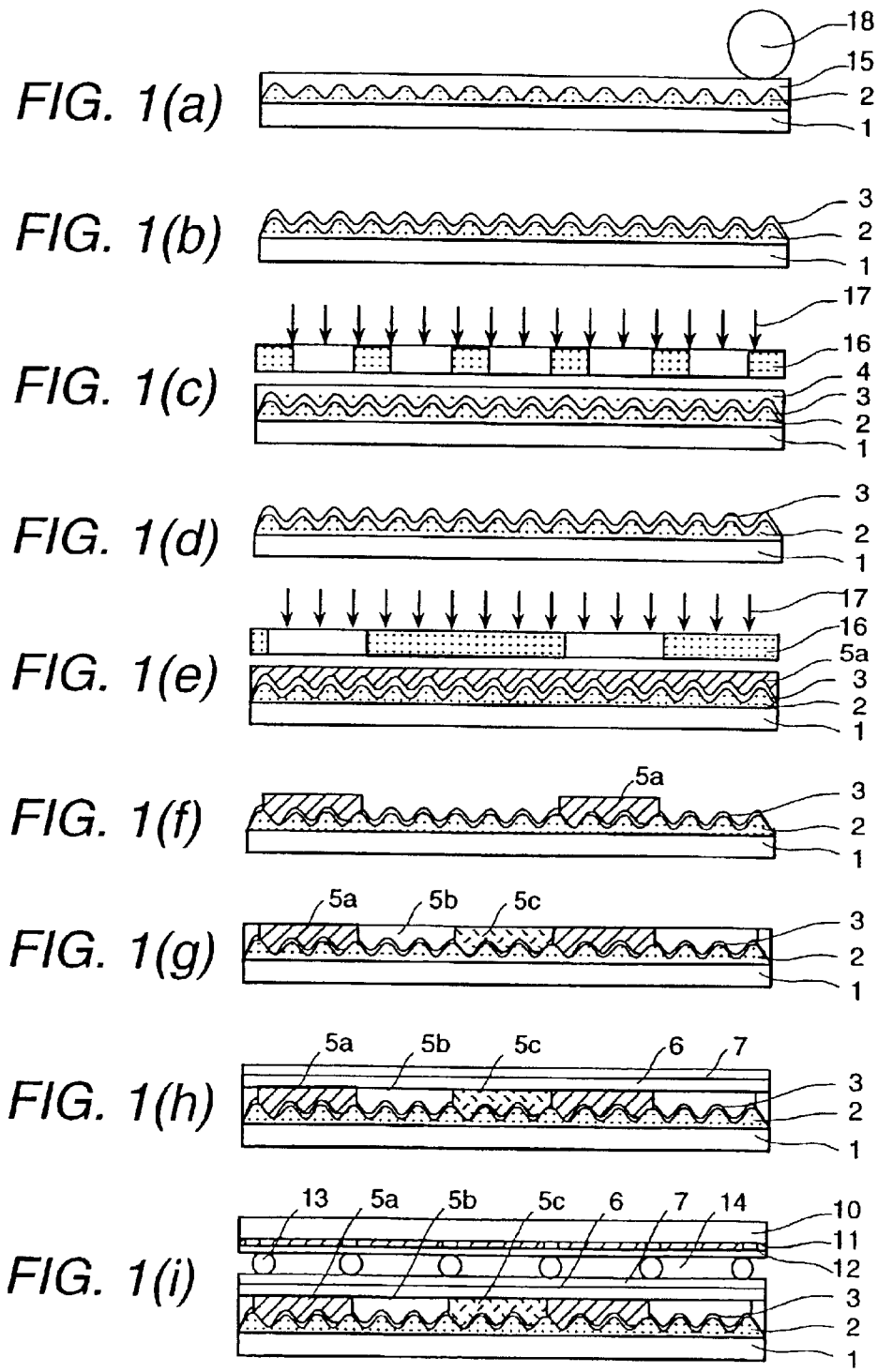
FIGS. 1(a) to 1(i) illustrate a set of schematic cross sections indicating steps in the manufacture of the reflective color liquid crystal display element of an embodiment 1.

An example of a method of forming an element of the reflective color liquid crystal display apparatus, practically, by arranging color filters (red, green, blue, or cyan, magenta, yellow) having a leveling function on a diffusion reflector provided inside the apparatus, wherein a plurality of reflectors, obtained by patterning each of the pixel electrodes onto a polymer layer forming a protrusion and a depression having a shielding function, according to the present invention, are laminated, includes the following manufacturing steps:

(1) a step of applying a photosensitive resin or a thermosetting resin onto a polymer base film, whereon many micro-protrusions and depressions are provided randomly (pitch: 10–30 μm, height or depth: 0.5–2.0 μm), drying the resin to obtaining a transcription film, and adhering the thin film made of the photosensitive resin or the thermosetting resin to a glass substrate by heating (50–150° C.) and pressurizing (1–12 kg/cm$^2$) the transcription film, using a laminator and the like, from the upper surface of the support, i.e. the polymer base film;
(2) a step of peeling off the polymer base film, i.e. the support;
(3) a step of forming a reflector (a thin film of aluminum, silver, and the like, film thickness: 100–300 nm) onto a thin polymer layer having the previously described protrusions and depressions, and in which a black pigment is dispersed;
(4) a step of patterning (removing portions of the reflector corresponding to non-aperture portion) the reflector corresponding to respective pixel electrodes;
(5) a step of forming color filters (red, green, blue, or cyan, magenta, yellow, film thickness: 1.0–5.0 μm) having a leveling function onto the reflector;
(6) a step of forming transparent electrodes (ITO (Indium Tin Oxide), film thickness: 100–300 nm) onto the color filters;
(7) a step of forming an alignment layer (polyimide, film thickness: 50–150 nm) onto the transparent electrode for composing an electrode substrate;
(8) a step of forming transparent electrodes onto a glass substrate for composing another electrode substrate;
(9) a step of forming an alignment layer (polyimide, film thickness: 50–150 nm) onto the transparent electrodes formed on the other electrode substrate in the step (8);
(10) a step of joining the electrode substrate, composed by the manufacturing step (7), to the other electrode substrate, composed by manufacturing step (9), so that the alignment layer of the respective planes face each other via a spacing material (polymer beads, silica beads, glass fiber, particle size: 6 μm), sealing the periphery of both electrode substrates with a sea ling material (epoxy resin wherein the above spacing material is dispersed) except for an injection opening;
(11) a step of preparing the liquid crystal display element by filling liquid crystal material into the interval between both electrode substrates via the injection opening, and then, sealing the injection opening.

And, the liquid crystal display apparatus of the present invention is completed by the following steps:

(12) a step of adhering a designated phase plate and a polarizer to a surface of the glass substrate, whereon only the transparent electrode is formed, of the liquid crystal display element;
(13) a step of connecting a TCP, whereon an IC for driving liquid crystal is mounted, and an external driving circuit to the liquid crystal display element; and
(14) a step of assembling the liquid crystal display element to a case, or frame, and the like.

Thus, the liquid crystal display apparatus of the present invention is completed.

In accordance with the present invention, (1) A reflective color liquid crystal display apparatus, which can display images of high brightness and high contrast, can be provided, because reflection light from a non-aperture portion can be decreased significantly by providing a black matrix function to the diffusion base layer (a polymer layer with protrusions and depressions) by dispersing black pigment and the like therein, and by arranging the reflector laminated on the diffusion base layer only at portions corresponding to an aperture.
(2) A reflective color liquid crystal display apparatus, which can display bright and high contrast images, can be product at a low price, because a black matrix can be omitted by providing the black matrix function to the diffusion base layer (a polymer layer with protrusions and depressions), and arranging the reflector only at aperture portions.
(3) A reflective color liquid crystal display apparatus, which can display bright images with a high contrast, can be provided at a low price, because the leveling layer can be omitted by providing the leveling function for eliminating steps of the diffusion reflector to the color filter by forming the color filter using a printing method, or a transcription method and the like.
(4) A reflective color liquid crystal display apparatus of low cost can be provided, because the number of materials used to form an element can be decreased by providing the black matrix function to the diffusion base layer and the leveling function to the color filter, respectively.

The resin materials using for the diffusion base layer (a polymer layer with protrusions and depressions) can be selected arbitrarily corresponding to its usage from any of available photosensitive resins and non-photosensitive resins.

Now, a reflective liquid crystal display element according to the present invention will be explained. In accordance with the present invention, a reflective super twisted pneumatic mode color liquid crystal apparatus (hereinafter, called a reflective STN color liquid crystal display apparatus), which is used for hand held type personal computers corresponding to a ½ VGA having a display scale of 640×240 dots (picture element pitch: 0.3 mm×0.3 mm, pixel size: 0.288 mm×0.288 mm, plane diagonal size: 8.1 inches) or out side purposes, mainly will be considered.

However, the present invention does not depend on the driving types of the liquid crystal, and the present invention is not restricted to the STN mode liquid crystal display type, because it is applicable to either the active addressing type or the passive type.

(Embodiment 1)

An example of a method of manufacturing the reflective color liquid crystal display element relating to the present invention will be explained with reference to a set of schematic cross sections illustrated in FIGS. 1(a) to 1(i).

In the manufacturing step of FIG. 7(a), a transcription film is prepared by coating a high polymer base film 15, on the surface of which many depressions have been formed (polyethylene terephthalate, film thickness: 50 μm, depression pitch: approximately 15 μm, depth of the depression: 1.2 μm), with a black pigment dispersed polymer layer 2 (film thickness: 1.5 μm) composed of acrylic resin (either of epoxy group resin or amido group resin is usable, the black pigment dispersed polymer layer 2 can be either of photosensitive resin or non-photosensitive resin), wherein a black pigment, carbon, or the like is dispersed; drying the film;

and, subsequently, adhering a cover film (not shown in the figure, polyethylene, film thickness: 6 μm) on the black pigment dispersed polymer layer 2.

The transcription film is transferred onto a glass substrate 1 (soda glass, thickness: 0.7 mm) using a laminator 18 (temperature of the substrate: 100° C., roll pressure: 6 kg/cm², moving velocity: 0.5 m/minute). Subsequently, main curing is performed (100° C./30 minutes), and the black pigment dispersed polymer layer 2 having many depressions is formed by peeling off the high polymer base film.

In the manufacturing step of FIG. 1(b), a reflector 3 made of aluminum (silver is usable, film thickness: 100 nm) is formed on the black pigment dispersed polymer layer 2 having many depressions.

In the manufacturing step of FIG. 1(c), after forming a photosensitive polymer layer 4 (film thickness: 1.5 μm) on the reflector 3, the photosensitive polymer layer 4 is exposed to ultraviolet rays 17 via a photo mask 16.

In the manufacturing step of FIG. 1(d), the photosensitive polymer layer 4 is developed under a designated developing condition to remove the reflector 3 at portions corresponding to intervals between electrodes and the black matrix layer, and to form the reflector 3 (size: 288 μm×88 μm, interval: 12 μm) at portions (rectangular shapes) corresponding only to locations where apertures are to be provided.

In the manufacturing steps of FIGS. 1(e) and 1(f), non-photosensitive color filters 5a, 5b, 5c (film thickness: 2.0 μm) are formed on the reflector 3 being patterned as rectangular shapes by an intaglio printing method so as to level the protrusions and depressions on the surface of the reflector 3.

In the manufacturing step of FIG. 1(g), the non-photosensitive color filters 5a, 5b, 5c are cured under a designated condition to form color filters of red, green, and blue (yellow, cyan, and magenta are usable) 5a, 5b, 5c.

In the manufacturing step of FIG. 1(h), a transparent electrode 6 (ITO, film thickness: 260 nm, scanning electrodes of; number of the electrode: 240, electrode pitch: 300 μm, electrode width: 292 μm, interval between the electrodes: 8 μm), and alignment layer 7 (polyimide group, film thickness: 70 nm) are formed on color filters 5a, 5b, 5c.

In the manufacturing step of FIG. 1(i), an electrode substrate formed by the above manufacturing steps of FIGS. 1(a) to 1(h) and another electrode substrate, which was manufactured by forming transparent electrodes 11 (ITO film, film thickness: 260 nm, signal electrode of; number of the 1920, electrode pitch: 100 μm, electrode 92 μm, interval between the electrodes: 8 pm), and an alignment layer 12 (polyimide group, film thickness: 700 nm) on a glass substrate 10 (soda glass, plate thickness: 0.7 mm), are arranged so that the transparent electrodes 6, 11 of the electrode substrates face each other. The two substrates are assembled via spacers 13 (particle size: 6 μm) made of polymer beads equivalent to the thickness of the liquid crystal layer 14.

Then, the two electrode substrates are sealed with a sealing material, which is made of epoxy resin mixed with polymer beads (silica beads are also usable) and formed at the periphery of the substrates; and, a reflective color liquid crystal display element was prepared by filling the interval between the electrode substrates with a liquid crystal 14 (a liquid crystal composition made of cyano PCH and a transfer derivative, refractive index anisotropy Δn: 0.133, twisted angle: 250°), and then sealing the interval (with photosensitive acrylic resin or photosensitive epoxy resin).

Figure 2:
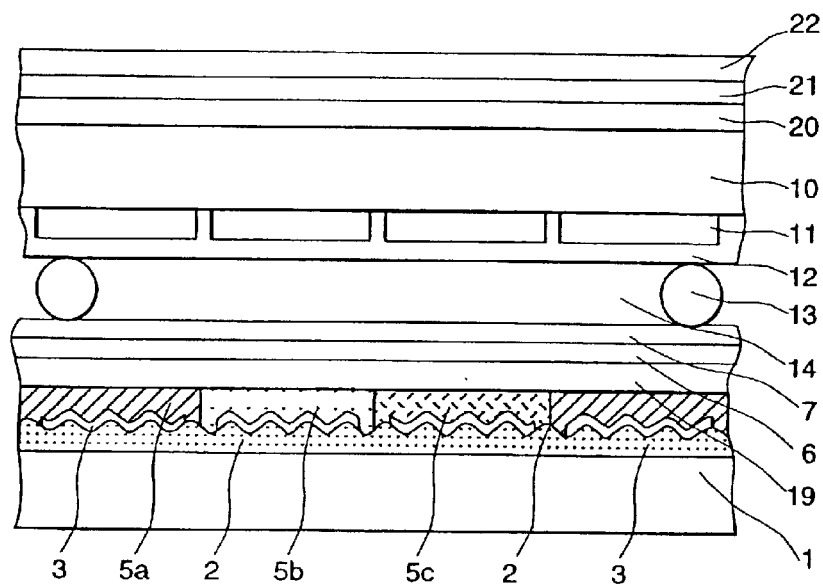
FIG. 2 is a schematic cross section of the reflective color liquid crystal display element of the embodiment 1.

Furthermore, the reflective color liquid crystal display element was manufactured by arranging designated phase plates 20, 21, and a polarizer 22 on the glass substrate of the above reflective color liquid crystal display element, as illustrated in FIG. 2.

Figure 3:
FIG. 3 is a schematic cross section of the reflective color liquid crystal display apparatus of the present invention.

Furthermore, as shown in FIG. 3, a reflective color liquid crystal display apparatus is formed by mounting a printed substrate, provided with a tape carrier package 31, on which there is provided an IC for driving the liquid crystal, power supply circuits, control circuits, and other elements, on the above reflective color liquid crystal display element 30.

Figure 4:
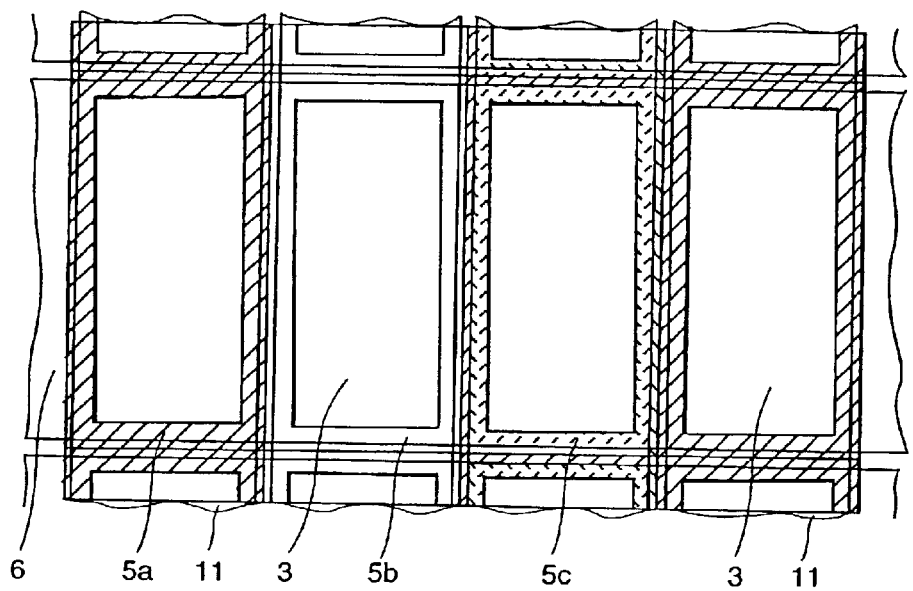
FIG. 4 is a schematic plan view indicating details of a pixel portion of the reflective color liquid crystal display element of the embodiment 1.

Next, a relationship among the reflector 3, color filters 5a, 5b, 5c, and transparent electrodes 6, 11 in the reflective color liquid crystal display element of the present invention will be described with reference to FIG. 4. As indicated in FIG. 4, the reflectors at the portion corresponding to the intervals between the transparent electrodes 6, 11 are removed, and color filters are laminated at the portions where the reflectors are removed. Therefore, a high contrast display becomes possible, because unnecessary incident light can be absorbed by not only the color filters, but also by the black pigment dispersed polymer layer 2, which is a base layer of the diffusion reflector, and unnecessary incident light from non-aperture portions can be eliminated even if the structure does not have a black matrix layer.

In a relationship between the reflector and the transparent electrodes, the interval between the reflective films is set somewhat wider than the interval between the transparent electrodes as indicated in FIG. 4. This setting is advantageous to the factors which affect image quality, such as brightness, contrast, and others.

In accordance with the present embodiment, the black pigment dispersed polymer layer, provided as the base layer for the diffusion reflector, was formed by arranging many fine protruded (semi-spherical) resins of approximately 15 μm in diameter and 1.2 μm high so as not to generate optical interference, and forming an aluminum film of 100 nm thick thereon. However, the material, shape, size, and other factors of the protruded resin can be selected depending on its object.

In accordance with the present embodiment, a reflective color liquid crystal display apparatus, providing images which are bright from all directions and are of high contrast, can be provided, because unnecessary reflecting light from the non-aperture portions can be eliminated by not only the reflective film on the black pigment dispersed polymer layer, i.e. the base layer of the diffusion reflector formed only at the apertures, but also by the black pigment dispersed polymer layer, i.e. the base layer of the diffusion reflector, which absorbs incident light at the non-aperture portions.

In particular, the element can be formed so that the aperture, which determines the brightness, can be controlled approximately by the preciseness of patterning only the reflective film and transparent electrodes, of which the patterning can be made relatively easily. Therefore, a reflective color liquid crystal display apparatus, which realizes bright images from all directions and images of high contrast, can be provided.

By forming the reflector and the color filters on a same glass substrate, an advantage relating to improvement of the production yield of the transparent electrodes can be realized, because the signal electrodes requiring a high preciseness corresponding to the color filters can be formed directly on the glass substrate of another electrode substrate.

In particular, in accordance with the present embodiment, the color filters 5a, 5b, 5c having flat surface can be formed on the diffusion reflector having large protrusions and depressions by a printing method or a transcription method. Therefore, not only does the leveling layer become unnecessary, but also other advantages, such as provision of a reflective color liquid crystal display apparatus which obtains bright and high contrast images, can be provided with a low cost.

Further, because signal electrodes having a narrow electrode width and a small electrode pitch can be formed directly onto the glass substrate, the mounting and correcting of the TCP provided with an IC for liquid crystal driving are easy, and an advantage of improved the production yield of the liquid crystal element can be achieved.

Furthermore, the number of manufacturing steps can be decreased significantly by using a transcription film, whereon the reflector and polymer layer are laminated sequentially onto a polymer base film having fine protrusions-depressions.

Particularly, the reflective color liquid crystal display apparatus, which produces uniform and bright images all over the display plane with a high contrast, can be provided at a low cost by forming the color filters using a printing method, by which it is possible to print the three colors of red, green, and blue simultaneously by one step, because color filters with a flat surface, which provides the same function as a leveling layer, can be formed.

Although it is not shown in the figure, a leveling layer also may be provided between the reflector 3 and the color filters 5a, 5b, 5c, or between the color filters 5a, 5b, 5c, and the transparent electrodes 6.

In accordance with the present embodiment, the diffusion reflector and the color filters were formed on the same substrate, but in a case when the diffusion reflector and the color filters were formed on different substrates, the same characteristics as the present embodiment can be obtained, even though the brightness is decreased somewhat.

(Embodiment 2)

Next, an example of another reflective color liquid crystal display element of the present invention will be explained with reference to FIG. 5.

Figure 5:
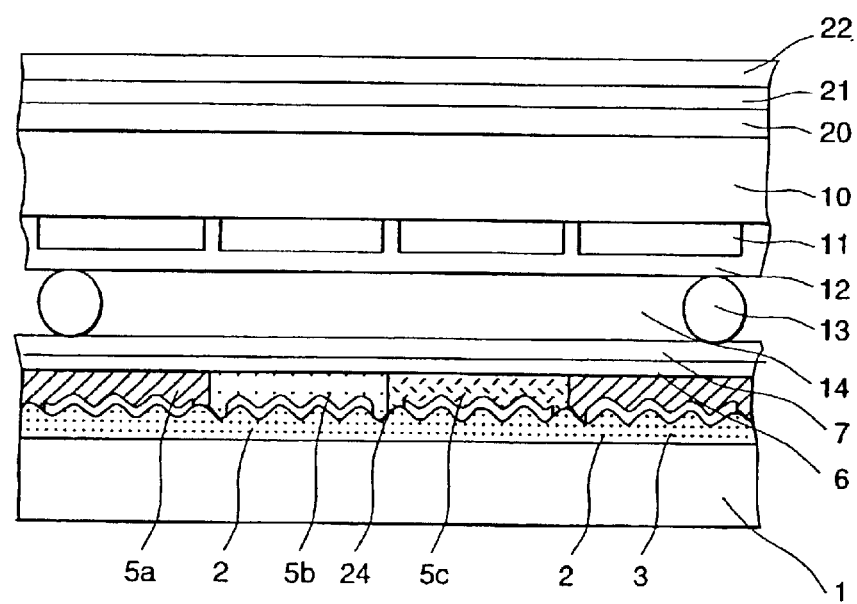
FIG. 5 is a schematic cross section of the reflective color liquid crystal display element of an embodiment 2.

As indicated in FIG. 5, the reflective liquid crystal display apparatus is provided with a reflective liquid crystal display element, which was prepared as follows. An electrode substrate, wherein a polymer layer 2 comprising many protrusions (resin: acrylic, protrusion pitch: approximately 15 $\mu$m, height: 1.2 $\mu$m), a reflective layer 3 (silver, film thickness: 100 nm), a black matrix layer 24 (silver, film thickness: 100 nm, blackening treatment: sulfide treatment, pitch: 300 $\mu$m×100 $\mu$m, width: 12 $\mu$m), color filters 5a, 5b, 5c (pigment type, film thickness: 3.0 $\mu$m, width: 100 $\mu$m), a transparent electrode 6 (ITO film, film thickness: 260 nm, width of electrode: 292 $\mu$m, interval between electrodes: 8 $\mu$m), and a alignment layer (polyimide, film thickness: 100 nm), were laminated on a glass substrate 1 (soda glass, plate thickness: 0.7 mm). Then, another electrode substrate, wherein transparent electrodes 11 (ITO film, film thickness: 260 nm, electrode width: 92 $\mu$m, interval between electrodes: 8 $\mu$m), and an alignment layer 12 (polyimide, film thickness: 100 nm) were laminated on a glass substrate 10 (soda glass, plate thickness: 0.7 mm). The above-described two electrode substrates were then opposed via a spacer material 13 of polymer beads (particle size: 8 $\mu$m), and liquid crystal 14 (a liquid crystal composition composed of cyano PCH and a transfer derivative, liquid crystal thickness: 6 $\mu$m, twisted angle: 250°) was filled into the interval between the two electrode substrates. Subsequently, a designated optical scattering plate 23, phase plates 20, 21, and a polarizer 22 were provided onto the outer side of the glass substrate 10 of the reflective liquid crystal display element.

In accordance with the present embodiment, the reflector at portions corresponding to the black matrix layer was blackened by sulfide treatment so as not to generate unnecessary steps on the surface of the reflector and to give a black matrix function to the non-aperture portions. It is advantageous to employ the leveling surface of the color filters 5a, 5b, 5c, whereby a reflective color liquid crystal display apparatus, which can display bright and high contrast images, can be provided.

In accordance with the present embodiment, the signal electrodes requiring a high preciseness can be formed directly on the one glass substrate, because the polymer layer, i.e. a base layer of the diffusion reflector, the reflector, and the color filters are formed on the other glass substrate. Therefore, the advantage of an improved production yield of the liquid crystal display element can be realized.

Furthermore, mounting and correcting the TCP provided with an IC for the driving liquid crystal are easy, and an advantage of improved production yield of the liquid crystal element can be achieved.

In accordance with the present embodiment, a silver film, the thickness of which was 100 nm, was used as the reflector, and the portions corresponding to the black matrix layer were blackened by sulfide treatment to provide a black matrix function. However, the material of the reflector, blackening treatment, and others can be selected based on its object.

Although it is not shown in the figure, a leveling layer also may be provided between the reflector 3 and the color filters 5a, 5b, 5c, or between the color filters 5a, 5b, 5c, and the transparent electrodes 6.

In accordance with the present embodiment, the diffusion reflector and the color filters are formed on the same substrate, but in a case when the diffusion reflector and the color filters were formed on different substrates, the same characteristics as the present embodiment can be obtained, even though the brightness is decreased somewhat.

(Embodiment 3)

Figure 6:
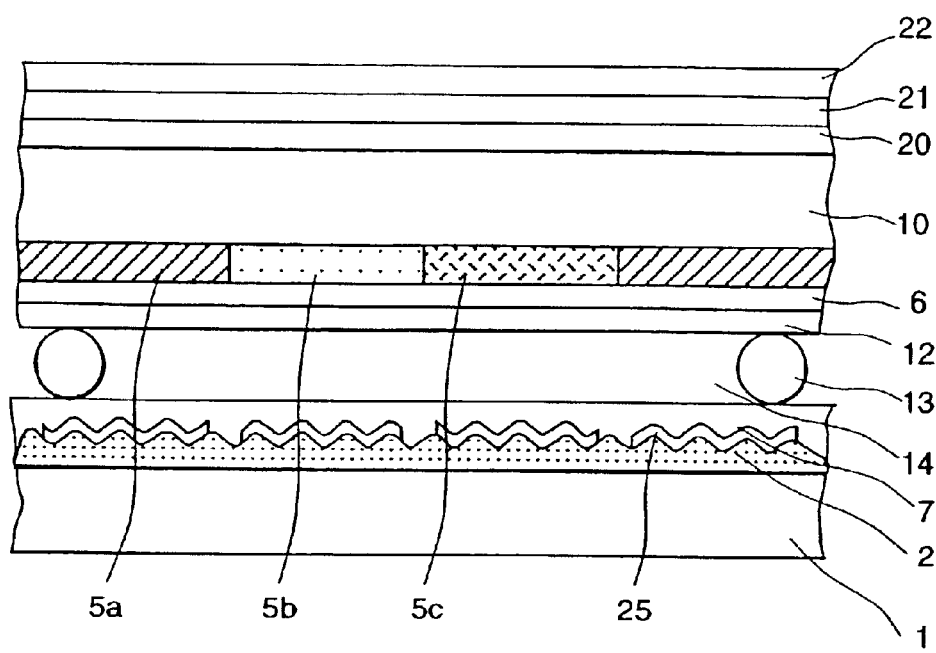
FIG. 6 is a schematic cross section of the reflective color liquid crystal display element of an embodiment 3.

Next, an example of another reflective color liquid crystal display element of the present invention will be explained with reference to FIG. 6.

First of all, as seen in FIG. 1(a), a transcription film is prepared by coating a polymer base film 15, on the surface of which many depressions have been formed at its surface, (polyethylene terephthalate, film thickness: 50 $\mu$m, depression pitch: approximately 15 $\mu$m, depth of the depression: 1.2 $\mu$m), with a black pigment dispersed polymer layer 2 (film thickness: 1.5 $\mu$m) composed of acrylic resin (either of epoxy group resin or amido group resin is usable, the black pigment dispersed polymer layer 2 can be either of photosensitive resin or non-photosensitive resin), wherein a black pigment, carbon, or the like is dispersed; drying the film; and, subsequently, adhering a cover film (not shown in the figure, polyethylene, film thickness: 6 $\mu$m) on the black pigment dispersed polymer layer 2.

The transcription film is transferred onto a glass substrate 1 (soda glass, thickness: 0.7 mm) using a laminator 18 (temperature of the substrate: 100° C., roll temperature: 100° C., roll pressure: 6 kg/cm$^2$, moving velocity: 0.5 m/minute). Subsequently, main curing is performed (240 C/30 minutes), and the black pigment dispersed polymer layer 2 having many depressions is formed by peeling off the polymer base film.

Then, as seen in FIG. 1(b), a reflector 3 made of aluminum (silver is usable, film thickness: 100 nm) is formed on the black pigment dispersed polymer layer 2 having many depressions.

Next, as seen in FIG. 1(c), after forming a photosensitive polymer layer 4 (film thickness: 1.5 $\mu$m on the reflector layer 3, the photosensitive polymer layer 4 is exposed to ultraviolet rays 17 via a photo mask 16.

In the next step, the photosensitive polymer layer 4 is developed with a designated developing condition to form the electrodes and reflective layer 25 (electrodes and reflector pitch: 100 μm, electrodes and reflector width: 88 μm, electrodes and reflector interval: 12 μm) at portions corresponding to the color filters.

In the next manufacturing step, the alignment layer 7 (polyimide, film thickness: 70 nm) having a leveling function for leveling the protrusions and depressions on the surface of the electrode and reflective layer 25 is formed on the electrode and reflective layer 25.

In the next manufacturing step, one of the color filters 5a (film thickness: 1.2 μm) of red, green, and blue (yellow, cyan, and magenta are usable) is formed on one of the electrode substrates formed by the above manufacturing steps, such as the glass substrate 10 (soda glass, plate thickness: 0.7 mm), by developing the photosensitive color filters 5a with a designated condition. Then, the color filters 5b (film thickness: 1.2 μm) and 5c (film thickness: 1.2 μm) are formed by repeating the same manufacturing step as used to form the color filter 5a.

In the next manufacturing step, the other electrode substrate, wherein the transparent electrode 6 (ITO, scanning electrodes of: film thickness: 260 nm, number of the electrode: 240, electrode pitch: 300 μm, electrode width: 288 μm, interval between the electrodes: 12 μm), and the alignment layer 12 (polyimide group, film thickness: 70 nm) were formed on the color filters 5a, 5b, 5c, was arranged so that the respective transparent electrodes 6, 11 faced each other, and the above described two electrode substrates were opposed via spacer material 13 of polymer beads (particle size: 6 μm) having a size equivalent to the thickness of the liquid crystal layer 14.

Then, both of the electrode substrates were sealed with a sealing agent, which was composed of an epoxy resin formed at the periphery of the substrates mixed with polymer beads (silica beads is usable), the liquid crystal 14 (a liquid crystal composition composed of cyano PCH and a transfer derivative, refractive index anisotropy Δn: 0.133, twisted angle: 250°) was filled into the interval between the two electrode substrates and sealed (photosensitive acrylic resin or photosensitive epoxy resin) to complete the reflective color liquid crystal display element.

Subsequently, designated phase plates 20, 21, and a polarizer 22 were provided on the outer surface of the glass substrate 10 of the reflective liquid crystal display element.

Furthermore, in the same manner as described with reference to FIG. 3, a reflective color liquid crystal display apparatus was formed by mounting a printed substrate provided with a tape carrier package, on which there is provided an IC for driving the liquid crystal, power supply circuits, control circuits, and other elements, on the above reflective color liquid crystal display element.

In accordance with the present embodiment, a reflective color liquid crystal display apparatus, which can display bright images of high contrast, can be provided at a low cost, because the black matrix layer was made unnecessary by patterning the reflector to operate as both the electrode and the reflector at the same time, and because the polymer layer, which was a base layer of the diffusion reflector, was given a black matrix function.

In particular, the element can be composed so that the aperture, which determines the brightness, can be set approximately by preciseness of patterning of only the transparent electrodes and the electrode and reflector, the patterning of which can be performed relatively easily. Therefore, the reflective color liquid crystal display apparatus, which can display bright images, with a high contrast, can be provided.

A leveling layer was formed between the color filters 5a, 5b, 5c and the transparent electrodes 6, or between the electrode and reflector 25, and the alignment layer 7. However, adoption of the leveling layer is optional depending on the display type and object.

When the color filters are not formed by a spincoat method, but are formed by using a transcription film, or a printing method, not only can the manufacturing steps be decreased significantly, but also the color filters can be formed more flat than ever. Therefore, using such techniques is advantageous in lowering the cost of manufacture and improving the contrast.

In accordance with the present embodiment, the diffusion reflector and the color filters were formed on separated substrates, but even when the diffusion reflector and the color filters are formed on the same substrate, the same characteristics as the present embodiment can be obtained.

(Embodiment 4)

Next, an example of another reflective color liquid crystal display element in accordance with the present invention will be explained hereinafter with reference to FIG. 7.

Figure 7:
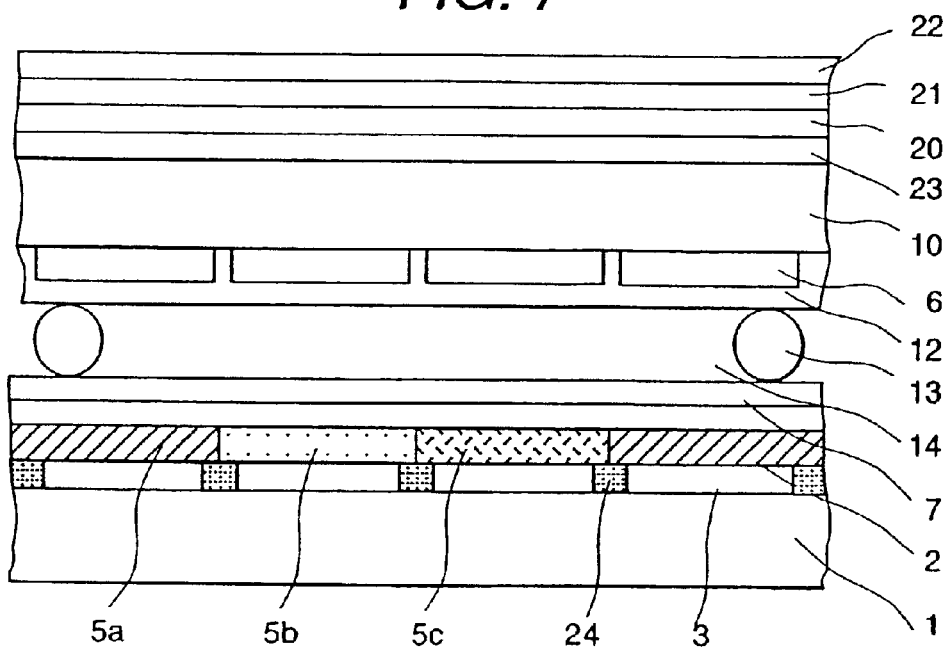
FIG. 7 is a schematic cross section of the reflective color liquid crystal display element of an embodiment 4.

As indicated in FIG. 7, the reflective liquid crystal display apparatus of this embodiment was provided with a reflective liquid crystal display element, which was prepared as follows. An electrode substrate was prepared, wherein a reflector 3 (silver, film thickness: 100 nm, size: 288 μm×88 μm, interval: 12 μm), a black matrix layer 24 (silver sulfide treatment, film thickness: 100 nm, width: 12 μm), color filters 5a, 5b, 5c (pigment type, film thickness: 1.2 μm, width: 100 μm), transparent electrode 6 (ITO film, film thickness: 260 nm, width of electrode: 292 μm, interval between electrodes: 8 μm), and an alignment layer 7 (polyimide, film thickness: 100 nm), were laminated on a glass substrate 1 (soda glass, plate thickness: 0.7 mm). Then, another electrode substrate was prepared, wherein transparent electrodes 11 (ITO film, film thickness: 260 nm, electrode width: 92 μm, interval between electrodes: 8 μm), and an alignment layer (polyimide, film thickness: 100 nm) were laminated on a glass substrate 10 (soda glass, plate thickness: 0.7 mm). Next, the above described two electrode substrates were opposed via a spacer material 13 of polymer beads (particle size: 6 μm), and liquid crystal 14 (a liquid crystal composition composed of cyano PCH and a transfer derivative, liquid crystal thickness: 6 μm, twisted angle: 250°) was filled into the interval between the two electrode substrates. Subsequently, a designated optical scattering plate 23, phase plates 20, 21, and a polarizer 22 were provided on the outside surface of the glass substrate 10 of the reflective liquid crystal display element.

In particular, the black matrix layer 24 was formed by blackening the reflector 3 at portions corresponding to the non-apertures with hydrogen sulfide solution using a photolithography method. Therefore, no steps were generated on the surface of the reflector, and the surface of the color filters 5a, 5b, 5c, formed on the reflective layer, become flat. Accordingly, a reflective color liquid crystal display apparatus, which can display high contrast and uniform images even if the leveling layer is removed, can be provided.

In accordance with the present embodiment, the signal electrodes requiring a high preciseness can be formed directly on the one glass substrate, because the polymer layer, i.e. a base layer of the diffusion reflector, the reflector, and the color filters were gathered to another glass substrate. Therefore, an advantage to improve the production yield of the liquid crystal display element can be realized.

Furthermore, mounting and correction of the TCP, which is provided with an IC for liquid crystal driving, are easy, and an advantage of an improved production yield of the liquid crystal element can be achieved.

In accordance with the present embodiment, the reflector was made with silver 100 nm thick using a hydrogen sulfide solution as the blackening treatment agent, but the materials of the reflector and the treatment agent can be selected based on the object.

Adoption of a leveling layer formed between the color filters 5a, 5b, 5c and the transparent electrode 6 (not shown in the figure) is arbitrary depending on the object.

In accordance with the present embodiment, the diffusion reflector and the color filters are formed on the same substrate. However, even if the diffusion reflector and the color filters are formed on different substrates, separately, the same characteristics as the present embodiment can be obtained.

(Embodiment 5)

Next, an example of another reflective color liquid crystal display element in accordance with the present invention will be explained hereinafter with reference to FIG. 8.

Figure 8:
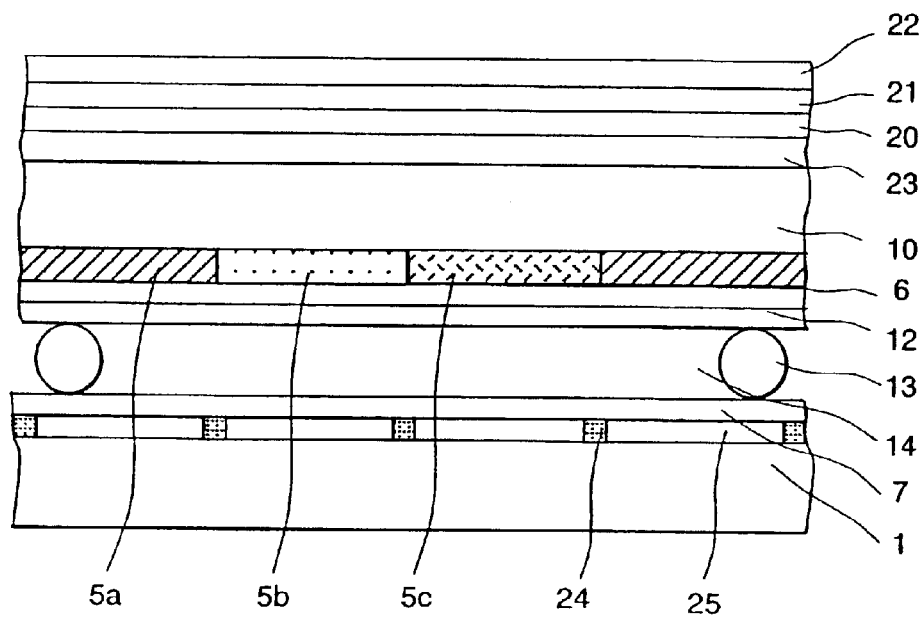
FIG. 8 is a schematic cross section of the reflective color liquid crystal display element of an embodiment 5.

As indicated in FIG. 8, the reflective liquid crystal display apparatus was provided with a reflective liquid crystal display element, which was prepared as follows. An electrode substrate was prepared, wherein electrodes and a reflective layer 25 (aluminum, film thickness: 100 nm, number of electrodes: 1920, width of electrode: 92 μm, interval between the electrodes: 8 μm ), a black matrix layer 24 (pigment black, film thickness: 100 nm, line width: 12 μm), and an alignment layer 7 (polyimide group, film thickness: 100 nm), were laminated on a glass substrate 1 (soda glass, plate thickness: 0.7 mm). Then, another electrode substrate was prepared, wherein color filters 5a, 5b, 5c (pigment type, film thickness: 1.2 μm, width: 100 μm), transparent electrode 6 (ITO film, film thickness: 260 nm, number of electrode: 480, width of electrode: 292 μm, interval between electrodes: 8 μm), and an alignment layer 12 (polyimide group, film thickness: 100 nm) were laminated on a glass substrate 10 (soda glass, plate thickness: 0.7 mm). Then, the above described two electrode substrates were opposed via a spacer material 13 of polymer beads (particle size: 6 μm), and a liquid crystal 14 (a liquid crystal composition composed of cyano PCH and a transfer derivative, liquid crystal thickness: 6 μm, twisted angle: 250°) was filled into the interval between the two electrode substrates. Subsequently, a designated optical scattering plate 23, phase plates 20, 21, and a polarizer 22 were provided on the outer surface of the glass substrate 10 of the reflective liquid crystal display element.

In particular, by this structure, wherein the metallic electrode operates at the same time as the reflector, the aperture which determines the brightness can be determined merely by the preciseness of patterning of the metallic electrode and reflector 25, and the transparent electrodes 6. Accordingly, a reflective color liquid crystal display apparatus, which can display bright images of high contrast, can be provided.

In accordance with the present embodiment, the surface of the alignment layer 7 can be leveled by using a so-called back-exposure method, wherein the black matrix layer 24, which is provided at intervals of the metallic electrodes and reflector 25, is formed by irradiating ultraviolet rays from the glass substrate 1 side using the metallic electrodes and reflector 25 as a photo mask. Therefore, a reflective color liquid crystal display apparatus, which can display bright images of high contrast, can be provided.

In accordance with the present embodiment, the color filters and the scanning electrodes, represented by a small number of electrodes, are formed on the one glass substrate, and the signal electrodes, which require a high preciseness and are represented by a large number of electrodes, are formed directly on the other glass substrate. Therefore, an advantage of an improved the production yield of the liquid crystal display element can be realized.

Furthermore, mounting and correction of the TCP, which is provided with an IC for driving liquid crystal, are easy, and an advantage of an improved the production yield of the liquid crystal element can be achieved.

In accordance with the present embodiment, the electrodes and reflector 25 were made of aluminum 100 nm thick, and the black matrix layer was made of a photosensitive resin, wherein a black pigment was dispersed. However, the material for the electrode and reflector and others can be selected based on the object.

Adoption of a leveling layer formed between the electrode and reflector 25 and the alignment layer 7, and the color filters 5a, 5b, 5c and the transparent electrode 6 (not shown in the figure) is arbitrary depending on the object.

In accordance with the present invention, the following features are attained.

(1) Unnecessary reflected light from the non-aperture portions can be eliminated by absorbing the light incident on the non-aperture portions by not only patterning the reflective layer of the diffusion reflector so as to correspond to the dot size of the color filter, but also by blackening the polymer layer having the protrusions and depressions under the reflective layer. Therefore, a reflective color liquid crystal display apparatus, which can display bright images with a high contrast, can be provided.

(2) A reflective color liquid crystal display element having a high aperture ratio, which does not require formation of a black matrix layer on the reflective layer, can be manufactured by not only patterning the reflective layer of the diffusion reflector so as to correspond to the dot size of the color filter, but also by giving a black matrix function to the polymer layer having the protrusions and depressions under the reflective layer. Therefore, a reflective color liquid crystal display apparatus, which can display bright images with a high contrast, can be provided.

(3) Mounting and correction of the TCP, which is provided with an IC for liquid crystal driving, can be performed with a high production yield in manufacturing the liquid crystal display element, because the signal electrodes having a high preciseness can be formed directly on the one glass substrate by forming the diffusion reflective film and the color filters on the other substrate. Therefore, a reflective color liquid crystal display apparatus, which can display bright images with a high contrast, can be provided with a low cost.

(4) Unnecessary reflected light from the non-aperture portions can be decreased significantly by forming rectangular shaped reflective layers at only portions corresponding to apertures by patterning the reflective layer of the diffusion reflector so as to correspond to the dot size of the color filter, and by providing a black matrix layer having the same thickness as the reflective layer at intervals of the reflector. Therefore, a reflective color liquid crystal display apparatus, which can display bright images with a high contrast, can be achieved with a low cost.

Other embodiments of the present invention will be explained, hereinafter.

A practical example of the reflective color liquid crystal display apparatus provided with an internal diffusion reflector having novel patterns of the present invention is as follows.

An electrode substrate is manufactured by the following steps.

(1) At first, patterns of string shaped protrusions and string shaped depressions are generated by simulation of spinodal decomposition. Here, examples of model equations of spinodal decomposition for performing the simulation of spinodal decomposition are the Cahn-Hilliard (-Cook) equation given by the following equation 1, and the time dependent Ginzburg-Landau equation given by the following equation 2, and there are others.

$$\partial\phi(r,t)/(\partial t) = L\nabla^2 (\partial H\{\phi(r,t)\}/\partial\phi(r,t) \quad \text{(Equation 1)}$$

$$H\{\phi(r,t)\}/(k_B T) = \int dr[-A\ln(\cosh\phi) + (\tfrac{1}{2})\phi^2 + D/2(\nabla\phi)^2] \quad \text{(Equation 2)}$$

A pattern of simulated spinodal decomposition can be generated by numerical simulation of a spinodal decomposition model (enlarged moor approximation) by a Cell-Dynamical-System (CDS) indicated by the following equation 3.

$$<<\phi>> - \phi = (\tfrac{1}{6})(\Sigma\phi_{CLOSEST}) + (\tfrac{1}{12})(\Sigma\phi_{NEXT\ CLOSEST}) - \phi \quad \text{(Equation 3)}$$

By using any one of the above equations, a pattern having many smooth protrusions-depressions satisfying the following conditions can be formed. The conditions are 1) the pattern is composed of a string-shaped protruded pattern or a depressed pattern having an approximately uniform line width and smooth curves, 2) the string-shaped protrusions or string-shaped depressions are arranged continuously, or alternately, 3) slope angles of the cross sections of the string-shaped protrusion and string-shaped depression in a direction perpendicular to the longitudinal direction of the string-shaped protrusion and string-shaped depression are approximately symmetrical from right and left, 4) sums of the length of the protrusions or the depressions in a respective direction are approximately equal, or 5) sums of the length of the protrusions or the depressions differ from each other in the respective direction.

A manufacturing step for making a pattern with a photosensitive resin involves adding light (wavelength: 365 nm, dose: 50–500 mj/cm$^2$), heat (50–150° C.), and pressure (1–12 kg/cm$^2$) to a resin pattern formed with the photosensitive resin applied onto a glass substrate by a transcription roll (roll velocity: 0.1–3 m/minute), or plate and the like using the transcription roll or the plate having the pattern composed of the above string-shaped protrusions or the above string-shaped depressions.

Or a manufacturing step for making a pattern (width: 5–20 μm, height or depth: 0.5–2.0 μm) involves exposing light(wavelength: 365 m, dose 50–500 mj/cm$^2$) via a photo mask using the string-shaped pattern prepared by the simulation method of the spinodal decomposition for generating the string-shaped pattern as a black matrix pattern or transparent pattern, followed by designated development and curing.

(2) A reflector (a thin film made of aluminum, an aluminum alloy, silver, an silver alloy, film thickness: 100–300 nm) is formed on the patterned polymer layer.

(3) An insulating layer (acrylic group photosensitive resin or non-photosensitive resin, film thickness: 1.0–3.0 μm) is formed on the reflector.

(4) Then, transparent electrodes (ITO (Indium Tin oxide), film thickness: 100–300 nm) are adhered on, and patterning (number of the electrodes: 1920, pitch: 100 μm, interval between the electrodes: 8–20 μm) is carried out on the insulating layer.

(5) Finally, an alignment layer (polyimide, film thickness: 50–100 nm, temperature: 230–250° C.) is formed on the transparent electrodes.

The other electrode substrate is manufactured on a glass substrate by the following steps.

(6) A black matrix layer (a low surface reflection black matrix layer such as a black pigment dispersion type photosensitive resin, and three layered chromium, and the like, film thickness: 0.1–1.2 μm, pitch: 100 μm, width: 10–25 μm) was formed on the substrate.

(7) Thus, color filters (red, green, blue or cyan, magenta, yellow, pigment dispersion type acrylic group photosensitive resin, film thickness: 0.5–1.5 μm, pitch: 100 μm, width: 75–90 μm) were formed on the black matrix layer.

(8) A leveling layer (acrylic group photosensitive resin, film thickness: 1.0–3.0 μm, curing temperature: 230–250°/1 hour) was formed on the color filters.

(9) Then, transparent electrodes (ITO (Indium Tin Oxide), film thickness: 100–300 nm) were adhered on, and patterning (number of the electrodes: 240, pitch: 300 μm, interval between the electrodes: 8–20 μm) was carried out on, the leveling film.

(10) Finally, an alignment layer (polyimide, film thickness: 50–150 nm, temperature: 230–250° C.) was formed on the transparent electrodes.

Then, a liquid crystal display element is composed.

(11) The two electrode substrates are opposed so as to make each of the alignment layers of both electrode substrates face each other via spacer material (polymer beads, silica beads, glass fiber, particle size 6 μm), and the peripheries of both electrode substrates are adhered and sealed with a sealing agent (epoxy rein, wherein the above spacer material is dispersed).

(12) Finally, a liquid crystal is filled into the interval between the two electrode substrates.

Then, a liquid crystal display apparatus is completed by the following steps.

(13) First, designated phase plates and a polarizer are adhered onto the outer surface of the glass substrate, where the reflector is not formed, of the reflective liquid crystal display element.

(14) A TCP, whereon an IC for driving the liquid crystal is mounted, and an external driving circuit are connected to the liquid crystal display element

(15) Finally, the liquid crystal display element is assembled into a case, or frame, and the like.

In accordance with the present invention, a reflective color liquid crystal display apparatus capable of displaying bright images can be provided, because the reflective color liquid crystal display apparatus comprises an internal reflector having smooth protrusion and depression planes, whereon string-shaped protrusions or string-shaped depressions are arranged so as to be closest at portions corresponding to the pixel electrodes. The string-shaped protrusions or string-shaped depressions are formed for reflecting incident light from all directions, or incident light from a specified direction, toward the viewer as much as possible.

In accordance with the present invention, a reflective color liquid crystal display apparatus, which can produce bright images, can be provided at a low cost, because the reflective color liquid crystal display apparatus comprises a pattern, which is an irregularly arranged pattern in which string-shaped protrusions or string-shaped depressions can be arranged in a very close manner, by using 4 phase separation and generation pattern, obtained by a computer simulation method for analyzing spinodal decomposition, which is known as a phase separation phenomenon of a polymeric block polymer and others, as an original pattern for a transcription role, plates, or photo masks for forming the string-shaped protrusions or string-shaped depressions.

Further, in accordance with the present invention, a reflective color liquid crystal display apparatus and reflectors having desired reflecting characteristics can be provided, because control of reflecting characteristics, such as collecting the reflecting light in a specified direction, and the like, can be performed easily, by controlling the arranging ratio of length components of the string-shaped protrusion or string shaped depression in various directions without changing the cross sectional shapes of the protrusion and depression forming the string-shaped pattern, which can be controlled arbitrarily by a computer simulation, such as patterns for dies of the transcription role or plates, or photo mask patterns.

Furthermore, in accordance with the present invention, a reflective color liquid crystal display apparatus and reflectors, which can not only collect incident light from all the directions relative to the viewer, but also obtain less positive reflecting components (light components reflected from flat portions), which deteriorates images, and so brighter images can be provided furthermore, photo masks or transcription dies, which are most suitable for various forming methods, such as a transcription method, photolithography, and others, can be formed readily by taking the phase separation and generation pattern obtained by computer simulation into a computer and by performing image processing to modify the patterns.

A reflective color liquid crystal display apparatus most suitable for executing the present invention will be explained, hereinafter. In accordance with the present invention, a hand-held personal computer (hereinafter called a hand-held PC) corresponding to ½ VGA and having a display scale of 540×240 dots (picture element pitch: 0.3 mm×0.3 mm, pixel size: 0.288 mm×0.288 mm, display diagonal size: 8.1 inches), and a reflective super twisted pneumatic mode color liquid crystal display apparatus for outdoor use (hereinafter, called reflective STN mode color liquid crystal display apparatus) will be considered. However, because the present invention does not depend on the type of driving system of the liquid crystal, the present invention is not restricted to a STN mode liquid crystal display system, but is applicable to any system which employs on active addressing method or a passive method. (Embodiment 6)

In accordance with the reflective liquid crystal display apparatus of the present invention, bright images, which have no coloring by optical interference, can be obtained by forming the string-shaped protrusions and depressions in the polymer layer, which is the base layer of the diffusion reflector.

FIG. 9(a) illustrates a photo mask pattern for forming a string-shaped protrusion and depression pattern in the polymer layer, i.e. the base layer of the diffusion reflector. The drawing, and the dark portions (light shielding portions) are the portions which comprise a protrusion or a depression. However, depending on the material used, reversing the dark portions and the bright portions in the same pattern may be necessary. FIG. 9(b) illustrates the polymer layer generated by the photo mask pattern indicated in FIG. 9(a).

Figure 10A:
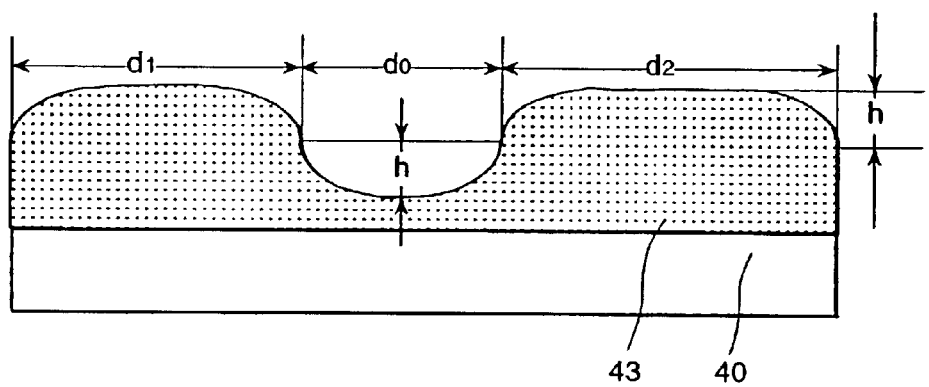
FIGS. 10(a) to 10(c) are diagrams which show a cross sectional structure of the diffusion reflector composed of string shaped protrusions and string shaped depressions.
Figure 10B:
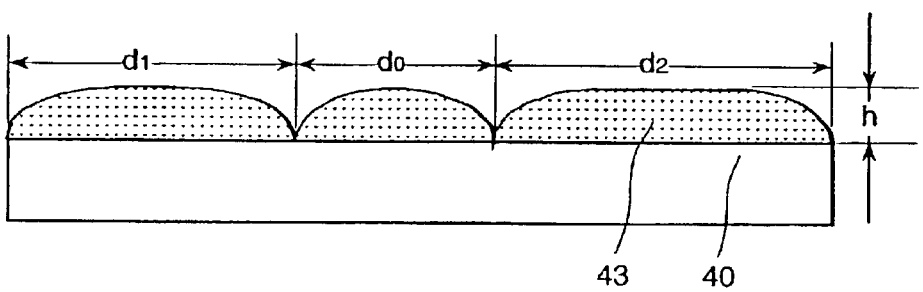
Figure 10C:
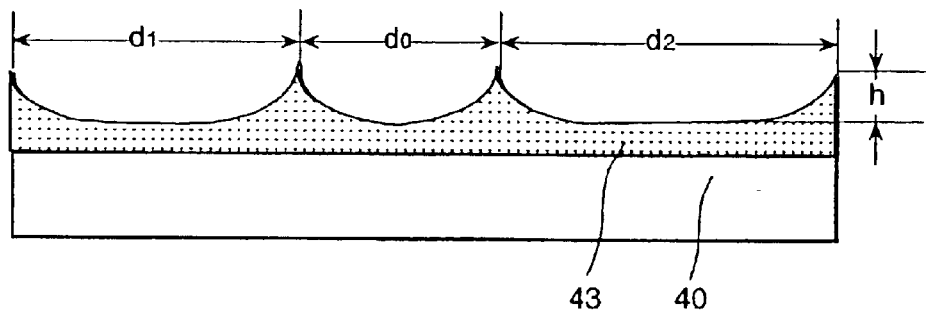

FIGS. 10(a) to 10(c) illustrate various cross sections of the polymer layer, whereon the string-shaped protrusions and depressions are formed, as seen in FIG. 9(b) along portions of the line a1-a2.

FIG. 10 1 illustrates a pattern, wherein the string-shaped protrusions and the string-shaped depressions are arranged alternately and continuously. FIG. 10b indicates a pattern, wherein the string-shaped protrusions are arranged continuously. FIG. 10c indicates a pattern, wherein the string-shaped depressions are arranged continuously. Here, d0, d1, and d2 indicate the length of the protrusion or the depression, and h indicates the height of the protrusion or the depth of the depression. The reference character d1 indicates the length of a portion where the pattern of the protrusion or the depression crosses perpendicularly with the line a1-a2, and this is equivalent to the width of the protrusion or the depression. That is, FIG. 10b illustrates a pattern that is formed by arranging the protrusions or the depressions by drawing parabolas of height h continuously. Sometimes, depending on the material, all of the widths can not be maintained perfectly equal. However, if the widths are approximately equal, the advantages of the present invention can be realized.

Features of the string-shaped protrusion, the string-shaped depression, or the string-shaped protrusion and depression formed in the polymer layer of the present invention will be explained hereinafter.

Because incident light reflects the shape of the protrusion or the depression of the string-shaped pattern, when drawing parabolas, the slope angles of which are distributed approximately symmetrically from right and left, the distribution of the intensity of reflected light becomes symmetrical from right and left in a direction normal to the substrate. On the other hand, if the slope angles are unsymmetrical from right and left, the distribution of the intensity of reflected light becomes unsymmetrical from right and left, and it becomes possible to cause the distribution of the intensity of reflected light to have a direction.

The sum of the intensity distribution of light as indicated in FIG. 9(b) depends on the lengths d0, d1, and d2 of the protrusion or the depression, as indicated in FIGS. 10(a) to 10(c). Accordingly, when the sum of the length of the protrusion or the depression in a lateral direction (in a direction b1), and the sum of the length of the protrusion or the depression in a vertical direction (in a direction of b2), as indicated in FIG. 9(b), are equal, the sums of the intensity distribution of light in the lateral direction and in the vertical direction become equal. That is, the brightness in the lateral direction and the brightness in the vertical direction become equal. When the sum of the length of the protrusion or the depression in the vertical direction (in a direction b2) is longer than the sum of the length of the protrusion or the depression in the lateral direction (in a direction b1), the sums of the intensity distribution of light in the lateral direction becomes larger than the sums of the intensity distribution of light in the vertical direction. That is, the lateral direction becomes brighter than the vertical direction. The above situation is similar in diagonal directions (the directions b3 and b4), and the brightness can be changed or made equal according to the length of the protrusion or the depression. The vertical lines in FIGS. 10(a) to 10(c) indicate boundaries between a protrusion and a depression, between a protrusion and a protrusion, and between depression and a depression. Accordingly, if a ratio of the numbers of the boundaries in the vertical direction and in the lateral direction is the same, the brightness in the vertical direction and in the lateral direction will be equal.

If the protrusion and the depression in a string-shaped pattern extend linearly (in parallel) in the same direction, the brightness is decreased by the interference of light. Then, the protrusion and the depression in a string-shaped pattern, as indicated in FIG. 9(b), are composed to extend with the drawing curves. That is, the interference of light can be decreased by decreasing the linear portions in parallel with the protrusions and the depressions. The most preferable composition is that in which each of the protrusions and the depressions are formed as curves and extend in random directions (indiscriminately). In this case, the interference of light becomes minimum.

As indicated in FIGS. 10a, 10b, and 10c, flat portions between the protrusions and depressions, between the protrusions and other protrusions, and between depressions and other depressions can be eliminated by forming the protrusions and depressions immediately adjacent to each other so that the protrusions and the depressions extend continuously. Accordingly, the reflector can be made brighter, because not only will the flat portions causing unnecessary positive reflecting light be eliminated, but also the incident light will be collected effectively in a direction toward the viewer.

When the protrusions and the depressions are formed continuously so as not to leave the flat portions, the protrusions and the depressions are arranged closest. Therefore, this state is called a close packing arrangement, hereinafter.

In accordance with the present embodiment, the length d corresponding to the width of a string-shaped protrusion or a string-shaped depression was selected in the range of 5–20 $\mu$m, preferably in the range of 8–15 $\mu$m, and the height and depth of the string-shaped protrusion or the string-shaped depression was set in the range of 0.5–2.0 $\mu$m, preferably in the range of 0.8–1.5 $\mu$m.

Figure 11:
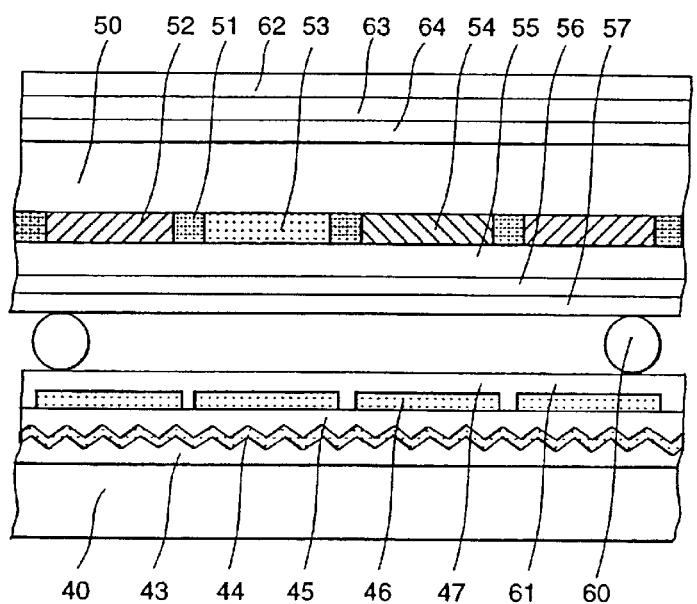
FIG. 11 is a schematic cross section of the reflective color liquid crystal display element in an embodiment 6.
Figure 12:
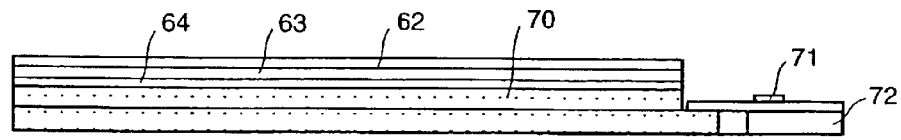
FIG. 12 is a schematic cross section of the reflective color liquid crystal display apparatus of the present invention.

A cross sectional structure of the embodiment of the liquid crystal display element and the liquid crystal display apparatus used in the reflective liquid crystal display apparatus of the present invention are illustrated in FIG. 11 and FIG. 12, respectively. FIG. 11 shows a cross section of the liquid crystal display element, and FIG. 12 shows a cross section of the liquid crystal display apparatus.

As seen in FIG. 11, the one electrode substrate of the liquid crystal display element is composed by laminating a polymer layer 43 having many protrusion-depression planes composed of string shaped protrusions and string-shaped depressions (acrylic group, film thickness: 1.5 $\mu$m, width of the protrusion or the depression: 13 $\mu$m, height of the protrusion or the depression: 1.0 $\mu$m), a reflector 14 (aluminum, film thickness: 100 nm), an insulating layer 45 (acrylic group, film thickness: 2.0 $\mu$m), transparent electrodes 46 (ITO film, film thickness: 260 nm, number of electrodes: 1920, pitch of the electrodes: 100 $\mu$m, width of electrode: 88 $\mu$m, interval between the electrodes: 12 $\mu$m and an alignment layer 17 (polyimido group, film thickness: 100 nm) on a glass substrate 40 (soda glass, plate thickness: 0.7 mm).

The other electrode substrate of the liquid crystal display element is composed by laminating a black matrix layer 51 (three layered chromium, film thickness: 0.1 $\mu$M, width: 12 $\mu$m, pigment black, film thickness: 0.6 $\mu$m, width 12 $\mu$m), color filters 52, 53, 54 (pigment type, film thickness: 1.2 $\mu$m, width: 100 $\mu$m), a leveling film 55 (acrylic group, film thickness: 2.0 $\mu$m), transparent electrodes 56 (ITO film, film thickness: 260 nm, number of electrodes: 240, pitch of the electrodes: 300 $\mu$m, width of electrode: 288 $\mu$m, interval between the electrodes: 12 $\mu$m), and an alignment layer 57 (polyimide group, film thickness: 100 nm) on a glass substrate 50 (soda glass, plate thickness: 0.7 mm). These glass substrates are then opposed via spacer material 60 of polymer beads (particle size: 6 $\mu$m), and liquid crystal 61 (a liquid crystal composition composed of cyano PCH and a transfer derivative, liquid crystal thickness: 6 $\mu$m, twisted angle: 250° is filled into the interval between the two glass substrates 40, 50. The reflective color liquid crystal display element is composed by arranging designated phase plates 63, 64, and a polarizer 62 onto the outer surface of the glass substrate 50. As shown in FIG. 12, a reflective color liquid crystal display apparatus is composed by mounting a tape carrier package, having an IC for driving the liquid crystal, and an external driving circuit 72 on the liquid crystal display element 70.

In accordance with the present embodiment, a reflective color liquid crystal display apparatus having no optical interference, which can display bright images, can be provided because it comprises a reflective color liquid crystal display element having an inside reflector, wherein string-shaped protrusions or the string-shaped depressions are randomly arranged in the regions corresponding to the pixels and in a close packing arrangement, and the reflective color liquid crystal display element can be manufactured by forming reflectors for collecting incident light from all the directions in a direction toward the viewer using string-shaped protrusions or string-shaped depressions.

In accordance with the present embodiment, a reflective color liquid crystal display apparatus having no optical interference, which can display bright images, can be provided because the arrangement of the string-shaped protrusions or the string-shaped depressions can be controlled arbitrarily, and a reflective color liquid crystal display element adequate for illuminating environment can be manufactured by preparing a photo mask pattern or a transcription pattern for forming the fine protrusions-depressions pattern composed of string-shaped protrusions or the string-shaped depressions by a computer simulation method for analyzing spinodal decomposition, which is known by a phase separation phenomenon, such as polymeric block copolymer and others.

In accordance with the present embodiment, a reflective color liquid crystal display apparatus can be provided at a low price, because the reflective color liquid crystal display element can be manufactured at a low cost by forming the polymer layer having the fine protrusion-depression planes composed of string-shaped protrusions or string-shaped depressions by a transcription method with a transcription role, transcription plate, or transcription film, wherein polymer layers having fine protrusion-depression planes composed of the string-shaped depressions on its base film are laminated.

It is common to all embodiments, that, in accordance with the present invention, the string-shaped protrusion or the string-shaped depression are prepared using a computer simulation method for analyzing spinodal decomposition. However, the pattern also may be prepared directly by controlling environmental conditions, such as temperature, pressure and other conditions of the polymer, liquid crystal, colloid, and the like, and by inducing a phenomena, such as phase transfer or phase separation, for example.

In accordance with the present embodiment, the width of a string-shaped protrusion or a string-shaped depression was selected as 13 $\mu$m. However, the present invention is not restricted to this width. Furthermore, in accordance with the present embodiment, only one value of the width of a string-shaped protrusion or a string-shaped depression was selected, such as 13 $\mu$m. However, the present invention can be composed of plural string-shaped protrusions or string-shaped depressions having different widths. By using different widths, the intensity distribution relative to the angles can be altered, and bright images can be displayed in a wide range.

(Embodiment 7)

Figure 13:
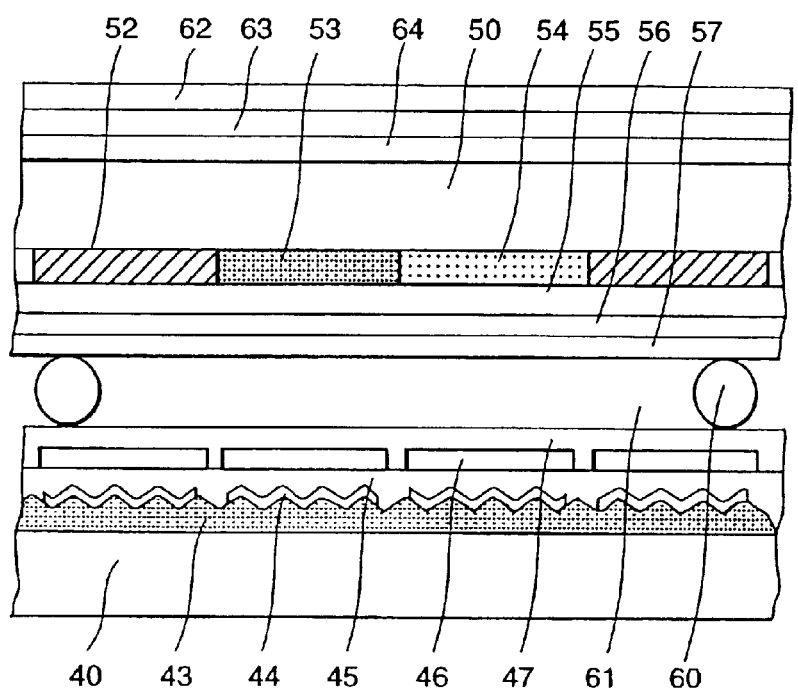
FIG. 13 is a schematic cross section of the reflective color liquid crystal display element in an embodiment 7.

FIG. 13 shows a cross section of another liquid crystal display element of the present invention.

As indicated in FIG. 13, the one electrode substrate of the liquid crystal display element is composed by laminating a polymer layer 43 having many protrusion-depression planes composed of string-shaped protrusions and string-shaped depressions (optical absorber: black pigment, base material: photosensitive acrylic resin, film thickness: 0.6 μm, width of the protrusion or the depression: 13 μm, height of the protrusion or the depression: 1.0 μm), a reflector 44 arranged only at portions corresponding to the pixels (aluminum, film thickness: 100 nm, size: 88 μm×288 μm), an insulating layer 45 (acrylic group, film thickness: 2.0 μm), transparent electrodes 46 (ITO film, film thickness: 260 nm, number of electrodes: 1920, pitch of the electrodes: 100 μm, width of electrode: 92 μm, interval between is the electrodes: 8 μm and an alignment layer 47 (polyimide group, film thickness: 100 nm) on a glass substrate 40 (soda glass, plate thickness: 0.7 mm).

The other electrode substrate of the liquid crystal display element is composed by laminating color filters 52, 53, 54 (pigment type, film thickness: 1.2 μm, width: 100 μm) (yellow, cyan, and magenta are usable), a leveling layer 55 (acrylic group, film thickness: 2.0 μm), transparent electrodes 56 (ITO film, film thickness: 260 nm, number of electrodes: 240, pitch of the electrodes: 300 μm, width of electrode: 292 μm, interval between the electrodes: 8 μm), and an alignment layer 57 (polyimide group, film thickness: 100 nm) on a glass substrate 50 (soda glass, plate thickness: 0.7 mm). These glass substrates are opposed via spacer material 60 of polymer beads (particle size: 6 μm), and liquid crystal 61 (a liquid crystal composition composed of cyano PCH and a transfer derivative, liquid crystal thickness: 6 μm, twisted angle: 250°) is filled into the interval between the two glass substrates 40, 50. The reflective color liquid crystal display element is composed by arranging designated phase plates 63, 64, and a polarizer 62 onto the outer surface of the glass substrate 50. FIG. 12 shows a reflective color liquid crystal display apparatus composed by mounting a tape carrier package 71, having an IC for driving the liquid crystal, and an external circuit 72 for driving the liquid crystal display element 70.

In accordance with the present embodiment, reflective color liquid crystal display apparatus, which can display bright images having a high contrast, can be provided, because it comprises a reflective color liquid crystal display element having a structure providing a uniform liquid crystal thickness, wherein only the color filters 53, 54, 55 are arranged on a facing substrate, and the reflective color liquid crystal display element can be manufactured by adding a black matrix function to the reflective electrode substrate by dispersing black pigment into the polymer layer 41 having fine protrusion-depression planes composed of the string-shaped protrusions or the string-shaped depressions, patterning, the reflector 44 in rectangular shapes, and arranging the reflector at only portions corresponding to the pixel electrode.

In accordance with the present embodiment, a reflective color liquid crystal display apparatus, which can display bright images having a high contrast, can be provided, because a reflective color liquid crystal display element having a high aperture ratio can be manufactured by performing a patterning treatment, which determines the aperture ratio, only on the metallic reflector 44 and the transparent electrodes 46, 56, which are readily treated by the patterning.

In accordance with the present embodiment, a reflective color liquid crystal display apparatus, which can display bright images having a high contrast, can be provided at a low cost, because the reflective color liquid crystal display element can be manufactured at a low cost by forming the color filters 52, 53, 54 using a three color simultaneous printing method.

Embodiment 8)

Figure 14:
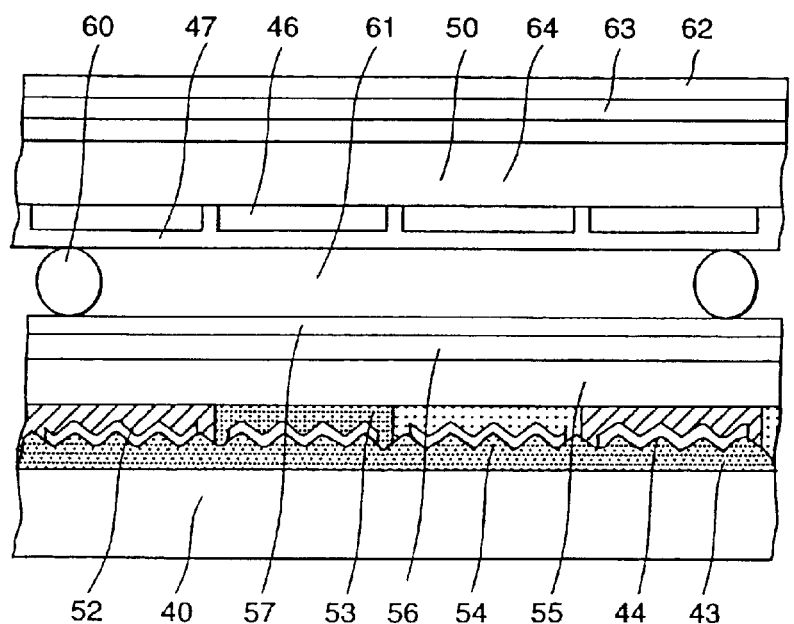
FIG. 14 is a schematic cross section of the reflective color liquid crystal display element in an embodiment 8.

FIG. 14 shows a cross section of another liquid crystal display element of the present invention.

As seen in FIG. 14, the one electrode substrate of the liquid crystal display element is composed by laminating a polymer layer 43 having many protrusion-depression planes composed of string-shaped protrusions and string-shaped depressions (optical absorber: black pigment, base material: photosensitive acrylic resin, film thickness: 0.6 μm, width of the protrusion or the depression: 13 μm, height of the protrusion or the depression: 1.0 μm), color filters 52, 53, 54 of red, green, and blue (pigment type, film thickness: 1.2 μm, width: 100 μm) (yellow, cyan, and magenta are usable), a leveling film 55 (acrylic group, film thickness: 2.0 μm), transparent electrodes 46 (ITO film, film thickness: 260 nm, number of electrodes: 240, pitch of the electrodes: 300 μm, width of electrode: 292 μm, interval between the electrodes: 8 μm), and an alignment layer 47 (polyimide group, film thickness: 100 nm) on a glass substrate 40 (soda glass, plate thickness: 0.7 mm).

The other electrode substrate of the liquid crystal display element is composed by laminating transparent electrodes 46 (ITO film, film thickness: 260 nm, number of electrodes: 1920, pitch of the electrodes: 100 μm, width of electrode: 92 μm, interval between the electrodes: 8 μm), and an alignment layer 47 (polyimide group, film thickness: 100 nm) on a glass substrate 50 (soda glass, plate thickness: 0.7 mm).

These two glass substrates are opposed via spacer material 60 of polymer beads (particle size: 6 μm), and liquid crystal 61 (a liquid crystal composition composed of cyano PCH and a transfer derivative, liquid crystal thickness: 6 μm, twisted angle: 250°) is filled into the interval between the two glass substrates 40, 50. The reflective color liquid crystal display element is composed by arranging designated phase plates 63, 64, and a polarizer 62 onto the outer surface of the glass substrate 50. As shown in FIG. 12, a reflective color liquid crystal display apparatus is composed by mounting a tape carrier package 71, having an IC for driving the liquid crystal, and an external driving circuit 72 on the liquid crystal display element 70.

In accordance with the present embodiment, reflective color liquid crystal display apparatus, which can display bright and high contrast images, can be provided, because a reflective color liquid crystal display element having a high aperture ratio can be manufactured by eliminating the insulating layer and the black matrix layer, which typically would be provided between the reflector 44 and the transparent electrodes 46, by giving a black matrix function to the polymer layer 43 by dispersing black pigment into the polymer layer 43 having fine protrusion-depression planes composed of string-shaped protrusions or string-shaped depressions, patterning the reflector 44 in rectangular shapes so that the reflection is provided at only portions corresponding to the pixel electrode and laminating the color filters 53, 54, 55 onto the reflector 44.

In accordance with the present embodiment, an advantage of improved production yield of the reflective color liquid crystal display element can be achieved, because the signal electrodes requiring a high preciseness can be formed directly on one of the glass substrates by providing the polymer layer 43, the reflector 44, and the color filters 52, 53, 54 on the other glass substrate.

Furthermore, an advantage of improved production yield of the liquid crystal element can be achieved, because the mounting and correcting of the TCP, whereon the IC for driving is provided, can be performed readily.

In accordance with the present embodiment, the leveling layer was arranged on the color filters 52, 53, 54. However, because a leveling function is provided to the color filters by superposed printing using the previously described three color simultaneous printing method, a reflective color liquid crystal display element having no leveling film 55 can be manufactured, and so a reflective color liquid crystal display apparatus, which can display bright images having a high contrast, can be provided at a low price.

(Embodiment 9)

Figure 15:
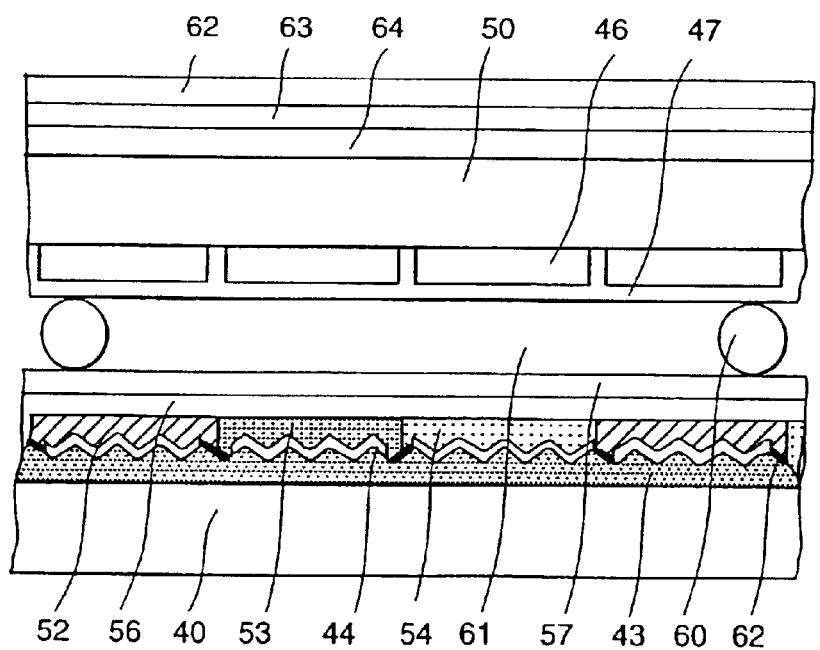
FIG. 15 is a schematic cross section of the reflective color liquid crystal display element in an embodiment 9.

FIG. 15 shows a cross section of another liquid crystal display element of the present invention.

As seen in FIG. 15, the one electrode substrate of the liquid crystal display element is composed by laminating a polymer layer 43 having many protrusion-depression planes composed of string-shaped protrusions and string-shaped depressions (optical absorber: black pigment, base material: photosensitive acrylic resin, film thickness: 0.6 μm, width of the protrusion or the depression: 13 μm, height of the protrusion or the depression: 1.0 μm), reflector 44 arranged only at the portions corresponding to pixel (silver, film thickness: 100 nm), a black matrix layer 65 (blackened by sulfide treatment, pitch: 100 μm×300 μm, width: 12 μm), color filters 52, 53, 54 (pigment type, film thickness: 1.2 μm, width: 100 μm) of red, green, and blue (yellow, cyan, and magenta are usable), transparent electrodes 46 (ITO film, film thickness: 260 nm, number of electrodes: 240, pitch of the electrodes: 300 μm, width of electrode: 292 μm, interval between the electrodes: 8 μm), and an alignment layer 57 (polyimide group, film thickness: 100 nm) on a glass substrate 40 (soda glass, plate thickness: 0.7 mm).

The other electrode substrate of the liquid crystal display element is composed by laminating transparent electrodes 46 (ITO film, film thickness: 260 nm, number of electrodes: 1920, pitch of the electrodes: 100 μm, width of electrode: 92 μm, interval between the electrodes: 8 μm), and an alignment layer 47 (polyimide group, film thickness: 100 nm) on a glass substrate 50 (soda glass, plate thickness: 0.7 mm).

These two glass substrates are opposed via spacer material 60 of polymer beads (particle size: 6 μm), and liquid crystal 61 (a liquid crystal composition composed of cyano PCH and a transfer derivative, liquid crystal thickness: 6 μm, twisted angle: 250°) is filled into the interval between the two glass substrates. The reflective color liquid crystal display element is composed by arranging designated phase plates 63, 64, and a polarizer 62 onto the outer surface of the glass substrate 50. As shown in FIG. 12, a reflective color liquid crystal display apparatus is composed by mounting a tape carrier package 71, having an IC for driving the liquid crystal, and an external driving circuit 72 on the liquid crystal display element 70.

In accordance with the present embodiment, a reflective color liquid crystal display apparatus, which can display bright images with a high contrast, can be provided, because it comprises reflective color liquid crystal display element having flat surface color filters 52, 53, 54 which can be manufactured by adding a black matrix function, without generating any steps on the reflector, but by blackening only the portions of the reflector corresponding to the black matrix portions by sulfide treatment and the like, so that patterning of the reflector 44 formed on the polymer layer 43 having fine protrusion-depression planes composed of the string-shaped protrusions or the string-shaped depressions is not performed.

In accordance with the present embodiment, a reflective color liquid crystal display apparatus, which can display bright images with a high contrast, can be provided, because a reflective color liquid crystal display element having a high aperture ratio can be obtained by forming a matrix black matrix layer 65 by blackening treatment of a part of the reflector 44, with no patterning of the reflecting film.

In accordance with the present embodiment, an advantage of improved production yield of the reflective color liquid crystal display element can be achieved, because the transparent electrodes 46 requiring a high preciseness can be formed directly on one of the glass substrates by providing the polymer layer 43, the reflector 44, and the color filters 52, 53, 54 on the other glass substrate.

Furthermore, an advantage of improved production yield of the liquid crystal element can be achieved, because the mounting and correcting of the TCP, whereon the IC for driving is provided, can be performed readily.

In accordance with the present embodiment, a reflective color liquid crystal display apparatus, which can display bright images having a high contrast, can be provided at a low price, because, by obtaining the color filters 52, 53 by superposed printing using the previously described three color simultaneous printing method, not only the removing of the steps on the surface of the color filters, but also the manufacturing of the reflective color liquid crystal display element can be achieved at a low cost.

(Embodiment 10)

Hereinafter, a method of manufacturing the reflective liquid crystal display element and the reflective liquid crystal display apparatus of the present invention will be explained with reference to a set of schematic cross sections shown in FIGS. 16(a) to 16(j).

In FIG. 16(a), a polymer layer 43 made of acrylic resin (epoxy resin or amido group resin is usable, the polymer layer can be either one of photosensitive and non-photosensitive), wherein a black pigment is dispersed, is applied (film thickness: 1.5 μm) onto a polymer base film 42 (polyethylene terephthalate, film thickness: 50 μm, depression pitch: approximately 13 μm, depression depth: 50 μm), which is a support having string-shaped protrusions and depressions on the surface. After being dried, a transcription film is prepared by providing a cover film (not shown in the figure, polyethylene, film thickness: 6 μm) on the polymer layer 43. The transcription film 41 is transferred to the glass substrate 40 (soda glass, plate thickness: 0.7 mm) using a laminator 48 (substrate temperature: 100° C., roll temperature: 100° C., roll pressure: 6 kg/cm², moving velocity: 0.5 m/minute), and, subsequently, main curing is performed (240° C./30 minutes), after which the polymer base film 42 is peeled off to form the polymer layer 43 comprising many protrusions and depressions.

In FIG. 16(b), a reflector 44 made of aluminum (silver is usable, film thickness: 100 nm) is formed on the surface of the polymer layer 43 comprising many protrusions and depressions.

In FIG. 16(c), after applying photosensitive resin (non-photosensitive resin is usable, film thickness: 1.5 μm) onto the reflector 44, the photosensitive resin is irradiated with ultraviolet rays 59 using a photo mask 58. Next, the photosensitive resin and the reflector 44 are developed with a designated developing condition to form rectangular reflector 44 (aluminum, film thickness: 100 nm, size: 288 μm×88 μm, interval 12 μm), an insulating layer 45 (acrylic resin), transparent electrodes 46 (signal electrodes of ITO film, film thickness: 260 nm, number of electrodes: 640, electrode pitch: 100 μm, electrode width: 88 μm, interval between the electrodes: 12 μm), and an alignment layer 47 (polyimide, film thickness: 700 nm) on the one electrode substrate.

In FIG. 16(*d*), a photosensitive resin is applied onto the other glass substrate 50 (soda glass, plate thickness: 0.7 mm). Then, the photosensitive resin is irradiated with ultraviolet rays 59 via the photo mask 58 to form the boundaries 51 of the color filter areas.

In FIG. 16(*e*), the boundaries 51 are developed with a designated developing condition. In FIG. 16(*f*), a coloring layer 52 of the photosensitive resin is applied onto the substrate to fill the gaps formed by the boundaries 51. Then, the coloring layer 52 is irradiated with ultraviolet rays 59 via the photo mask 58.

In FIG. 16(*g*), the photosensitive coloring layer 52 is developed with a designated developing condition to form a color filter 52 of any one of red, green, and blue (yellow, cyan, and magenta are usable).

In FIG. 16(*h*), the color filters 53, 54 are formed by repeating the same manufacturing steps as used to form the color filter 52.

In FIG. 16(*i*), after forming the leveling layer 55 (either one of photosensitive resin and non-photosensitive resin is usable, film thickness: 2.5 μm) onto the color filters 52, 53, 54, the transparent electrode 56 (ITO, scanning electrodes of: film thickness: 260 nm, number of the electrode: 240, electrode pitch: 300 μm, electrode width: 288 μm, interval between the electrodes: 12 μm), and the alignment layer 57 (polyimide group, film thickness: 70 nm) are formed thereon.

In FIG. 16(*j*), one of the above two electrode substrates manufactured by the manufacturing steps of FIGS. 16(*a*) to 16(*c*) and the other electrode substrate manufactured by the manufacturing steps of FIGS. 16(*d*) to 16(*i*) are arranged so that each of the transparent electrodes 46, 56 faces each other, and both electrode substrates are joined via spacer material 60 of polymer beads having a particle size equivalent to the thickness of the liquid crystal 61 (particle size: 6 μm).

When, the reflective color liquid crystal display element was formed by sealing both electrode substrates with a sealing material, which is made of epoxy rein, wherein the above spacer material is dispersed, at peripheries of the substrates, filling the liquid crystal 61 ((a liquid crystal composition composed of cyano PCH and a transfer derivative, refractive index anisotropy Δn: 0.133, twisted angle: 250°) into the interval between the two electrode substrates, and sealing (photosensitive acrylic resin or photosensitive epoxy resin) the aperture through which the liquid crystal was injected.

As seen in FIG. 12, a reflective color liquid crystal display element was composed by arranging designated phase plates 63, 64, and a polarizer 62 onto the glass substrate 50 of the reflective color liquid crystal display element. A reflective color liquid crystal display apparatus was composed by mounting a tape carrier package 71, having an IC for driving the liquid crystal, and an external circuit for driving 72 on the liquid crystal display element 70.

(Embodiment 11)

Hereinafter, a method of manufacturing another reflective liquid crystal display element and reflective liquid crystal display apparatus of the present invention will be explained with reference to a set of schematic cross sections shown in FIGS. 17(*a*) to 17(*i*).

In FIG. 17, a polymer layer 43 made of acrylic resin (epoxy resin or amido group resin is usable, the polymer layer can be either one of photosensitive and non-photosensitive), wherein a black pigment is dispersed, is applied (film thickness: 1.5 μm) onto a polymer resist film 42 (polyethylene terephthalate, film thickness: 50 μm, depression pitch: approximately 13 μm, depression depth: 1.0 μm), which is a support having string-shaped protrusions and depressions on the surface. After the resin is dried, a transcription film is prepared by providing a cover film (not shown in the figure, polyethylene, film thickness: 6 μm) on the polymer layer 43. The transcription film 41 is transferred to the glass substrate 40 (soda glass, plate thickness: 0.7 mm) using a laminator 48 (substrate temperature: 100□ C., roll temperature: 100° C., roll pressure: 6 kg/cm$^2$, moving velocity 0.5 m/minute), and, subsequently main curing is performed (240° C./30 minutes), after which the polymer resist film 42 is peeled off to form the polymer layer 43 comprising many protrusions and depressions.

In FIG. 17(*b*), a reflector 44 made of aluminum (silver is usable, film thickness: 100 nm) is formed on the surface of the polymer layer 43 comprising many protrusions and depressions.

In FIG. 17(*c*), after applying photosensitive resin 49 (non-photosensitive resin is usable, film thickness: 1.5 μm) onto the reflector 44, the photosensitive resin 49 is irradiated with ultraviolet rays 59 using a photo mask 58.

In FIG. 17(*d*), the photosensitive resin 49 and the reflector 44 are developed with a designated developing condition to form rectangular reflector 44 (aluminum, film thickness: 100 nm, size: 288 μm×88 μm, interval 12 μm), and an insulating layer 45 (acrylic resin), transparent electrodes 46 (signal electrodes of ITO film, film thickness: 260 nm, number of electrodes: 640, electrode pitch: 100 μm, electrode width: 88 μm, interval between the electrodes: 12 μm), an alignment layer 47 (polyimide, film thickness: 700 nm) are formed on the one electrode substrate.

In FIG. 17(*e*): The coloring layer 52 of photosensitive resin is applied onto the other glass substrate (soda glass, plate thickness: 0.7 mm). Then, the coloring layer 52 of the photosensitive resin is irradiated with ultraviolet rays 59 via the photo mask 58 for forming the color filter.

In FIG. 17(*f*), the photosensitive color filter is developed with a designated developing condition to form a color filter 52 of any one of red, green, and blue (yellow, cyan, and magenta are usable).

In FIG. 17(*g*), the color filters 53, 54 are formed by repeating the same manufacturing steps as were used to form the color filter 52.

In FIG. 17(*h*), after forming the leveling layer 55 (either one of photosensitive resin and non-photosensitive resin is usable, film thickness: 2.5 μm) onto the color filters 52, 53, 54, the transparent electrode 56 (ITO, scanning electrodes of: film thickness: 260 nm, number of the electrode: 240, electrode pitch: 300 μm, electrode width: 288 μm, interval between the electrodes: 12 μm), and the alignment layer 57 (polyimide group, film thickness: 70 nm) are formed thereon.

In FIG. 17(*i*), one of the above two electrode substrates manufactured by the manufacturing steps of FIGS. 17(*a*) to 17(*d*) and the other electrode substrate manufactured by the manufacturing steps of FIGS. 17(*e*) to 17(*i*) are arranged so that each of the transparent electrodes 46, 56 faces each other, and both electrode substrates are joined via spacer material 60 of polymer beads having a particle size equivalent to the thickness of the liquid crystal 61 (particle size: 6 μm).

Then, the reflective color liquid crystal display element was formed by sealing both electrode substrates with a sealing material, which is made of epoxy rein wherein the above spacer material is dispersed, at peripheries of the substrates, filling the liquid crystal 61 ((a liquid crystal composition composed of cyano PCH and a transfer derivative, refractive index anisotropy Δn: 0.133, twisted angle: 250°) into the interval between the two electrode substrates, and sealing (photosensitive acrylic resin or photosensitive epoxy resin) the aperture through which the liquid crystal was injected.

As indicated in FIG. 12, a reflective color liquid crystal display element was composed by arranging designated phase plates 63, 64, and a polarizer 62 onto the glass substrate 50 of the reflective color liquid crystal display element. A reflective color liquid crystal display apparatus was composed by mounting a tape carrier package 71, having an IC for driving the liquid crystal, and an external driving circuit 72 on the liquid crystal display element 70.

In accordance with the present embodiment, the polymer layer comprising fine protrusion and depression planes composed of string-shaped protrusions or string-shaped depressions is formed by a transcription method, which is advantageous in decreasing cost, but the same polymer layer can be obtained by a printing method, a photolithography method, and the like. The feature of the present invention is in forming the fine protrusion and depression planes with a string-shaped pattern, and the present invention is not restricted by the method used for manufacturing the planes.

In accordance with the present embodiment, an aluminum film, having a film thickness of 100 nm, was formed as the reflector, and a chromium film, having a film thickness was of 100 nm, was formed as the black matrix layer. However, the materials and other factors for the reflector and the black matrix layer can be selected based on the object.

Adoption of the leveling film 55 is arbitrary based on the object. For instance, if the leveling film is formed only in the effective display region, mounting the TCP, whereon the IC for driving liquid crystal is mounted, becomes more advantageous.

As explained above, a reflective liquid crystal display apparatus having no coloring by optical interference, and which can obtain bright images, can be provided, because protrusions and depressions for collecting incident light in a direction toward viewers can be arranged in a designated region in a close packing manner by providing an inside reflector comprising randomly arranged smooth protrusion and depression reflecting planes, which is composed of string-shaped protrusions, and string-shaped depressions.

Furthermore, a reflective liquid crystal display apparatus having no coloring by optical interference, and which can obtain bright images, can be provided, because a composition, which can not only collect incident light from all the directions and direct it toward viewers, but also decrease the flat portions which generate a positive reflecting light component, is composed by providing an inside reflector, which comprises smooth protrusion and depression reflecting planes, wherein string-shaped protrusions or string-shaped depressions are arranged continuously and randomly, or the string-shaped protrusions and the string-shaped depressions are arranged alternately and randomly.

From the point of view of leveling, a case where the string-shaped protrusions or the string-shaped depressions are arranged continuously and randomly is more preferable than a case where the string-shaped protrusions and the string shaped depressions are arranged alternately and randomly, because in the former case only the height of the protrusion or the depression must be considered.

The case where the string-shaped protrusions and the string-shaped depressions are arranged alternately and randomly has a capability to decrease the amount of flat portions, which generate a positive reflecting light component, more than the case where the string-shaped protrusions or the string-shaped depressions are arranged continuously and randomly.

By controlling the pattern of the string-shaped protrusions or the string-shaped depressions so that the length component of the string-shaped protrusions and the length component of the string-shaped depressions in respective directions become approximately equal, a reflective liquid crystal display apparatus, which can obtain bright images, can be provided at a low price, because a reflector, which can collect incident light from all directions and direct it in a direction toward viewers, can be formed.

By controlling the pattern of the string-shaped protrusions or the string-shaped depressions so that the length component of the string-shaped protrusions and the length component of the string-shaped depressions in respective directions become different from each other, a reflective liquid crystal display apparatus, which can obtain bright images, can be provided at a low price, because a reflector, which can collect incident light from a particular direction and direct it effectively in a direction toward viewers, can be formed.

A reflective liquid crystal display apparatus, which can obtain bright images, can be provided at a low cost, because the patterns of the string-shaped protrusions and the string-shaped depressions are readily formed by providing an inside reflector comprising the string-shaped protrusions and the string-shaped depressions, the cross sectional slope angles of which are distributed so as to be approximately symmetrical from right and left.

A reflective color liquid crystal display apparatus, which can obtain bright images, can be provided at a low cost, because it comprises a reflective liquid crystal display element having a high aperture ratio which can be manufactured by coloring the polymer layer having the smooth protrusion-depression planes comprising string-shaped protrusions or the string-shaped depressions with black pigment and the like, and by forming its structure to pattern the reflective layer in a rectangular shape corresponding to the dot size of the coloring layer.

A reflective liquid crystal display apparatus, which can obtain bright images with a high contrast, can be provided at a low cost, because in the manufacture of the liquid crystal display element, the forming of the electrodes, and thee mounting and correcting of the TCP provided with an IC for driving the liquid crystal can be performed with a high production yield, and the liquid crystal display element can be manufactured by forming the reflector and the color filters on the same substrate, while forming the signal electrodes requiring a high preciseness directly onto the other glass substrate.

Furthermore, a reflective liquid crystal display apparatus, which can obtain bright images having a high contrast, can be achieved at a low cost, because unnecessary reflecting light from non-aperture portions can be decreased significantly by adding a black matrix function to the reflector corresponding to the black matrix layer using a method, such as blackening treatment and the like.

In accordance with the present embodiment, a polymer bead spacer is used, but a columnar spacer also can be used.

What is claimed is:

1. A reflective liquid crystal display apparatus with pixels comprising:
 a first electrode substrate, including
  a polymer layer having plural protrusions or depressions arranged randomly is formed on a glass substrate, and a reflective layer, color filters, transparent electrodes, and an alignment layer are formed and laminated sequentially on said polymer layer;

a second electrode substrate, including transparent electrodes and an alignment layer are formed and laminated on a glass substrate, arranged so that said alignment layer faces the alignment layer on said first electrode substrate; and a liquid crystal layer formed by filling a liquid crystal composition into an interval between said first and second electrode substrates;

wherein said plural protusions or depressions formed on said polymer layer comprise an irregular pattern defined by a phase separation phenomenon;

wherein said reflective layer is formed only at a portion corresponding to an aperture of each pixel; and wherein said polymer layer is colored black, and portions of said polymer layers corresponding to other than the aperture of each pixel provide a black matrix function.

2. A reflective liquid crystal display apparatus with pixels comprising:

a first electrode substrate, including a reflective layer, transparent electrodes, and an alignment layer formed on a polymer layer;

a second electrode substrate, including color filters, transparent electrodes, and an alignment layer formed on a glass substrate, said second electrode substrate being disposed so that said alignment layer thereof faces said alignment layer on said first electrode substrate; and a liquid crystal layer formed by filling a liquid crystal composition into an interval between said first and second electrode substrates;

wherein portions of said reflective layer corresponding to portions of each pixel other than apertures of each pixel are colored black.

3. A reflective liquid crystal display apparatus according to claim 1, wherein at least one of said color filters provides a leveling function.

4. A reflective liquid crystal display apparatus according to claim 1, wherein at least one of said color filters is formed onto said reflective layer by at least one of printing and transcription.

* * * * *